United States Patent
Liu

(10) Patent No.: US 10,680,696 B2
(45) Date of Patent: Jun. 9, 2020

(54) METHOD FOR MEASURING AND FEEDING BACK CHANNEL STATE INFORMATION, USER EQUIPMENT, AND BASE STATION

(71) Applicant: HUAWEI TECHNOLOGIES CO., LTD., Shenzhen, Guangdong (CN)

(72) Inventor: Jianqin Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

(21) Appl. No.: 15/971,076

(22) Filed: May 4, 2018

(65) Prior Publication Data

US 2018/0254815 A1    Sep. 6, 2018

Related U.S. Application Data

(63) Continuation of application No. PCT/CN2015/094036, filed on Nov. 6, 2015.

(51) Int. Cl.
*H04B 7/06*    (2006.01)
*H04B 7/0456*    (2017.01)
(Continued)

(52) U.S. Cl.
CPC ......... *H04B 7/0626* (2013.01); *H04B 7/0456* (2013.01); *H04B 7/0636* (2013.01);
(Continued)

(58) Field of Classification Search
CPC .. H04B 7/0626; H04B 7/0639; H04B 7/0632; H04B 7/063; H04B 7/0645; H04B 7/0636; H04W 72/0413; H04L 5/0057
See application file for complete search history.

(56) References Cited

U.S. PATENT DOCUMENTS

2011/0216846 A1    9/2011  Lee et al.
2013/0053077 A1*   2/2013  Barbieri ............... H04B 7/0626
                                                 455/509
(Continued)

FOREIGN PATENT DOCUMENTS

CN        102792605 A    11/2012
CN        103326830 A    9/2013
(Continued)

OTHER PUBLICATIONS

"3GPP TR 36.897 V1.0.1 (Jun. 2015), 3rd Generation Partnership Project;Technical Specification Group Radio Access Network;Study on Elevation Beamforming/Full-Dimension (FD) MIMO for LTE(Release 13), Technical Report, 58 pages".
(Continued)

*Primary Examiner* — Min Jung
(74) *Attorney, Agent, or Firm* — Fish & Richardson P.C.

(57) ABSTRACT

The present disclosure relates to a method for measuring and feeding back channel state information. In one example method, a user equipment (UE) receives a first channel state information report type configured by a base station and K channel state information-reference signal (CSI-RS) resources transmitted by the base station. The UE determines, according to the first channel state information report type, at least one of a rank indication (RI) and a beamforming indication (BI) on S subbands of a wideband on which the K CSI-RS resources are transmitted. The UE calculates a channel quality indicator (CQI) on the S subbands The UE reports the determined at least one of the RI and the BI, and the calculated CQI on a physical uplink control channel (PUCCH) by using a report.

16 Claims, 11 Drawing Sheets

(51) Int. Cl.
*H04L 5/00* (2006.01)
*H04L 1/00* (2006.01)
*H04L 25/02* (2006.01)
*H04W 72/04* (2009.01)

(52) U.S. Cl.
CPC ......... *H04B 7/0645* (2013.01); *H04L 5/0057* (2013.01); *H04B 7/063* (2013.01); *H04B 7/0632* (2013.01); *H04B 7/0639* (2013.01); *H04L 1/0026* (2013.01); *H04L 25/0204* (2013.01); *H04W 72/0413* (2013.01)

(56) References Cited

U.S. PATENT DOCUMENTS

| | | | |
|---|---|---|---|
| 2014/0003240 A1 | 1/2014 | Chen et al. | |
| 2014/0219115 A1* | 8/2014 | Etemad | H04W 28/12 370/252 |
| 2016/0080058 A1 | 3/2016 | Kang et al. | |
| 2016/0191131 A1* | 6/2016 | Balraj | H04B 7/0617 375/267 |
| 2016/0269089 A1* | 9/2016 | Liu | H04B 7/0626 |
| 2016/0359538 A1* | 12/2016 | Onggosanusi | H04B 7/0469 |
| 2017/0033856 A1 | 2/2017 | Su et al. | |
| 2017/0195934 A1* | 7/2017 | Kang | H04W 36/30 |
| 2018/0091280 A1* | 3/2018 | Kim | H04L 1/1671 |
| 2018/0175925 A1* | 6/2018 | Liu | H04B 7/0626 |
| 2018/0294848 A1* | 10/2018 | Park | H04B 7/0417 |
| 2018/0316404 A1* | 11/2018 | Xu | H04W 24/02 |

FOREIGN PATENT DOCUMENTS

| | | |
|---|---|---|
| CN | 104782071 A | 7/2015 |
| CN | 105007126 A | 10/2015 |
| EP | 3125438 A1 | 2/2017 |
| EP | 3324550 A1 | 5/2018 |
| WO | 2014178648 A1 | 11/2014 |

OTHER PUBLICATIONS

"3GPP TS 36.213 V12.7.0 (Sep. 2015), 3rd Generation Partnership Project;Technical Specification Group Radio Access Network;Evolved Universal Terrestrial Radio Access (E-UTRA);Physical layer procedures(Release 12), Technical Specification, 241 pages".
"3GPP TS 36.212 V12.6.0 (Sep. 2015), 3rd Generation Partnership Project;Technical Specification Group Radio Access Network;Evolved Universal Terrestrial Radio Access (E-UTRA);Multiplexing and channel coding(Release 12), Technical Specification, 95 pages".
International Search Report issued in International Application No. PCT/CN2015/094036 dated Jul. 27, 2016, 13 pages.
XP051039671 R1-155505 Samsung,"BI and PMI reporting for class B",3GPP TSG RAN WG1 Meeting #82bis,Malmö, Sweden, Oct. 5-9, 2015,total 5 pages.
Extended European Search Report issued in European Application No. 15907663.7 dated Sep. 20, 2018, 12 pages.
3GPP TR 36.897 V13.0.0 (Jun. 2015), "3rd Generation Partnership Project; Technical Specification Group Radio Access Network; Study on elevation beamforming / Full-Dimension (FD) Multiple Input Multiple Output (MIMO) for LTE (Release 13)," Technical Report, Jun. 2015, 58 pages.
Office Action issued in Chinese Application No. 201580084127.9 dated Sep. 12, 2019, 13 pages.

* cited by examiner

US 10,680,696 B2

METHOD FOR MEASURING AND FEEDING BACK CHANNEL STATE INFORMATION, USER EQUIPMENT, AND BASE STATION

CROSS-REFERENCE TO RELATED APPLICATIONS

This application is a continuation of International Application No. PCT/CN2015/094036, filed on Nov. 6, 2015, the disclosure of which is hereby incorporated by reference in its entirety.

TECHNICAL FIELD

The present invention relates to the communications field, and specifically, to a method for measuring and feeding back channel state information.

BACKGROUND

A multiple-antenna (Multiple-Input Multiple-Output, MIMO) technology has been widely applied to wireless communications systems to expand a system capacity and ensure cell coverage. For example, multiple-antenna-based transmit diversity, open-loop/closed-loop spatial multiplexing, and DM-RS-based multi-stream transmission are used for downlink in a Long Term Evolution (Long Term Evolution, LTE) system. The demodulation reference signal (Demodulation Reference Signal, DM-RS)-based multi-stream transmission is a main transmission mode in an LTE-A system and a subsequent system. A procedure of the DM-RS-based multi-stream transmission is as follows: UE first performs channel measurement according to a channel state indicator-reference signal (Channel Status Indicator Reference Signal, CSI-RS) configured by an evolved NodeB (evolved Node B, eNB). A measurement result includes a rank indication (Rank Indication, RI), a precoding matrix corresponding to the rank indication, and a channel quality indicator (Channel Quality Indication, CQI) corresponding to the rank indication and the precoding matrix. Then the UE feeds back the measurement result to the eNB. The eNB performs downlink scheduling according to the measurement result fed back by the UE, and sends a physical downlink shared channel (Physical Downlink Shared Channel, PDSCH) to the UE according to a scheduling result by using a DM-RS. Currently, two-dimensional beamforming is used for the DM-RS-based multi-stream transmission. That is, a transmit antenna is placed only horizontally, and can generate a beam only in a horizontal direction.

To further improve multiple-antenna system performance, a two-dimensional antenna configuration is being researched in the LTE Rel-12 standard. That is, antennas are placed in both the horizontal direction and a vertical direction, so that beamforming can be performed in both the horizontal direction and the vertical direction. This is referred to as three-dimensional beamforming. Therefore, in comparison with the current two-dimensional beamforming, a degree of freedom in the vertical direction is added. In this way, multiplexing can be performed for more users on a same time-frequency resource. Different users are distinguished from each other according to a beam in the vertical direction or the horizontal direction, so as to increase resource utilization or spectral efficiency.

For the 3D MIMO, in the prior art, user equipment (User Equipment, UE) feeds back a CQI, or a channel quality indicator (Channel Quality Indicator, CQI) and a precoding matrix indicator (Precoding Matrix Indicator, PMI) on a physical uplink control channel (Physical Uplink Control Channel, PUCCH). A specific feedback mode is PUCCH $X_1$-$X_2$. When a value of $X_1$ is 1, the CQI that is fed back is a bandwidth CQI; or when a value of $X_1$ is 2, the CQI that is fed back is a subband CQI. When a value of $X_2$ is 0, the PMI is not fed back; or when a value of $X_2$ is 1, the PMI is fed back, and the PMI indicates a precoding matrix in a preset codebook.

However, for a beamformed CSI-RS mechanism in LTE Rel-13, where Rel-13 is Release 13, a prior-art feedback mode does not consider reporting a newly added beamforming indication (Beamforming Indication, BI). Therefore, the existing PUCCH feedback mode cannot be applied to the beamformed CSI-RS mechanism in Rel-13. In addition, because an antenna configuration is changed into a two-dimensional, a new 2D codebook is used in a non-precoded CSI-RS mechanism in Rel-13. Because the existing feedback mode cannot be used, a new PUCCH feedback mode applicable to a latest 2D codebook is required.

SUMMARY

Embodiments of the present invention provide a method for measuring and feeding back channel state information. A new PUCCH feedback mode can be provided to adapt to a beamformed CSI-RS mechanism in Rel-13, and a new PUCCH feedback mode can be further provided to adapt to a non-precoded CSI-RS mechanism in Rel-13. In addition, multiplexing is performed for the two mechanisms as much as possible during design, so that design complexity of a feedback type and a feedback mode in the two different mechanisms is reduced.

In view of this, a first aspect of the embodiments of the present invention provides a method for measuring and feeding back channel state information, including:

receiving, by user equipment UE, a first channel state information report type configured by a base station and K CSI-RS resources delivered by the base station, where K is an integer greater than or equal to 1;

determining, by the UE according to the channel state information report type, an RI and/or a BI on S subbands of a wideband on which the K CSI-RS resources are transmitted, where S is an integer greater than or equal to 1;

calculating, by the UE, a CQI on the S subbands; and reporting, by the UE, the RI, the BI, and the CQI on a physical uplink control channel PUCCH by using a report.

It should be noted that the first channel state information report type is corresponding to a beamformed CSI-RS mechanism.

It may be understood that, after receiving the K CSI-RS resources delivered by the base station and the first channel state information report type configured by the base station, the UE determines that a beamformed CSI-RS mechanism is used for reporting. Then the UE determines the RI and/or the BI on the S subbands of the bandwidth on which the K CSI-RS resources are transmitted, and calculates the CQI on the S subbands. The UE reports different content at different reporting moments. For example, the UE separately reports the RI, separately reports the BI, or jointly reports the RI and the BI, and then reports the CQI. Specific reporting may be determined according to a PUCCH feedback mode. Because the PUCCH feedback mode is redesigned, the BI can be smoothly reported.

With reference to the first aspect, in a first possible implementation of the first aspect, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

It may be understood that the reporting period of the BI is greater than the reporting period of the RI. That is, in a same time period, a quantity of RI reporting times is greater than or equal to a quantity of BI reporting times. In addition, the report may have three formats: the format 1, the format 2, and the format 3. The report in the format 1 is separate reporting of the BI, the report in the format 2 is reporting of the RI, and the report in the format 3 is joint reporting of the BI and the RI. Reporting can be performed according to different formats or different format combinations in different PUCCH feedback modes.

With reference to the first possible implementation of the first aspect, in a second possible implementation of the first aspect, a PUCCH feedback mode is PUCCH 1-1 or PUCCH 2-1, the PUCCH 1-1 and the PUCCH 2-1 each include a feedback submode 1 and a feedback submode 2, the BI is reported in the feedback submode 1 and the feedback submode by using reports in different formats, and the BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1.

It may be understood that the PUCCH feedback mode 1-1 and the PUCCH feedback mode 2-1 each may include two different feedback submodes, that is, the feedback submode 1 and the feedback submode 2. The BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1. A reporting format of the report may be flexibly configured, so that scalability of the solutions in the embodiments of the present invention can be improved.

With reference to the first possible implementation of the first aspect, in a third possible implementation of the first aspect, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

It may be understood that the PUCCH feedback mode 1-1 and the PUCCH feedback mode 2-1 each include reporting of the report in the format 2 and reporting of the report in the format 3, that is, include reporting of the RI and joint reporting of the RI and the BI, so that the solutions in the embodiments of the present invention can be better implemented.

With reference to the first possible implementation of the first aspect, in a fourth possible implementation of the first aspect, a PUCCH feedback mode is PUCCH 1-1 or PUCCH 2-1, the report in the format 2 further includes a PMI, the PMI indicates a precoding matrix in a preset codebook, and the report that is in the format 2 and that includes the PMI is joint reporting of the RI and the PMI.

It may be understood that, when the PUCCH feedback mode is the PUCCH 1-1 or the PUCCH 2-1, the PMI may be further added to the report in the format 2, and the PMI and the RI are jointly reported, so that the solutions in the embodiments of the present invention can be better implemented.

With reference to the fourth possible implementation of the first aspect, in a fifth possible implementation of the first aspect, the method further includes:

the reporting period of the BI is M times the reporting period of the RI, and M is configured differently for different quantities of antenna ports, where M is an integer greater than or equal to 1.

It may be understood that, when the report in the format 2 is joint reporting of the RI and the PMI, the reporting period of the BI is M times the reporting period of the RI.

With reference to the first possible implementation of the first aspect, in a sixth possible implementation of the first aspect, the UE determines a precoding type indicator (Precoder type indicator, PTI) on the S subbands of the wideband on which the K CSI-RS resources are transmitted, where the PTI indicates a precoding type; and the report in the format 1 further includes a PMI or the PTI, a report that is in the format 1 and that includes the PMI is joint reporting of the BI and the PMI, a report that is in the format 1 and that includes the PTI is joint reporting of the BI and the PTI, the report in the format 3 further includes the PTI, and the report that is in the format 3 and that includes the PTI is joint reporting of the BI, the RI, and the PTI.

It may be understood that, when determining the RI and the BI, the UE further determines the PTI. The UE can determine the PMI usually when the base station configures the channel state information report type for the UE. Both the PMI and the PTI may be included in the report in the format 1 or the report in the format 3, so that the solutions in the embodiments of the present invention can be better implemented by means of flexible reporting configuration.

With reference to the sixth possible implementation of the first aspect, in a seventh possible implementation of the first aspect, a PUCCH reporting format includes a format 3a, a format 6a, and a format 7, and a quantity of feedback bits of the report is determined according to at least one of a quantity of CSI-RS resources or a quantity of spatial multiplexing layers.

It may be understood that the PUCCH reporting format may include the format 3a, the format 6a, and the format 7. In these formats, a specific quantity of feedback bits of the report is determined according to at least one of the quantity of CSI-RS resources or the quantity of spatial multiplexing layers.

With reference to the seventh possible implementation of the first aspect, in an eighth possible implementation of the first aspect, the PMI in the report that is in the format 1 and that includes the PMI is first precoding $i_1$ in a double codebook structure or precoding i in a single codebook structure, and the method further includes:

performing downsampling on the precoding i or the first precoding where the report that is in the format 1 and that includes the PMI is joint reporting of the BI and the precoding i or the BI and the first precoding It may be understood that the PMI may be the first precoding $i_1$ in the double codebook structure or the precoding i in the single codebook structure. Downsampling is performed on the precoding i or the first precoding $i_1$. The downsampling indicates that sampling is performed on a sample sequence once every several samples, to obtain a new sequence. The new sequence is obtained after downsampling is performed on the original sequence. Downsampling processing may be performed on the sample i or $i_1$ herein. Then the sample i or $i_1$ may be included in the report that is in the format 1 and that includes the PMI. That is, the BI and i are jointly reported, or the BI and $i_1$ are jointly reported.

With reference to the first aspect, in a ninth possible implementation of the first aspect, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

It may be understood that, when the PUCCH feedback mode is the PUCCH 1-1, this mode includes reports in three formats, that is, the report that is in the format 1 and that is for jointly reporting the BI and the RI, the report that is in the format 2 and that is for reporting the RI, and the report that is in the format 3 and that is for reporting the wideband CQI and the wideband PMI or jointly reporting the wideband CQI, the wideband PMI1, and the wideband PMI2. The PMI1 and the PMI2 are two PMIs in a double codebook, and the reporting period of the report in the format 2 is greater than or equal to the reporting period of the report in the format 3. In this reporting manner, the PUCCH feedback mode 1-1 can adapt to the beamformed CSI-RS mechanism in Rel-13.

With reference to the ninth possible implementation of the first aspect, in a tenth possible implementation of the first aspect, there are two or four antenna ports, and the report in the format 3 is reporting of the wideband CQI and the wideband PMI. It may be understood that, if there are two or four antenna ports, the report in the format 3 is reporting of the wideband CQI and the wideband PMI.

With reference to the ninth possible implementation of the first aspect, in an eleventh possible implementation of the first aspect, there are four or eight antenna ports, and the report in the format 3 is joint reporting of the wideband CQI, the wideband PMI1, and the wideband PMI2. It may be understood that, if there are two or four antenna ports, the report in the format 3 is joint reporting of the wideband CQI, the wideband PMI1, and the wideband PMI2.

With reference to the first aspect, in a twelfth possible implementation of the first aspect, a PUCCH feedback mode is PUCCH 2-1, there are two or four antenna ports, a format of the report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2.

It may be understood that, when the PUCCH feedback mode is the PUCCH 2-1, if there are two or four antenna ports, the report may have three formats. That is, the report in the format 1 is joint reporting of the BI and the RI, the report in the format 2 is reporting of the wideband PMI and the wideband CQI, and the report in the format 3 is reporting of the RI. Reporting is performed according to a proper combination of the three formats, so that the solutions in the embodiments of the present invention can be better implemented.

With reference to the first aspect, in a thirteenth possible implementation of the first aspect, a PUCCH feedback mode is PUCCH 2-1, there are four or eight antenna ports, a format of the report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2, so that the PUCCH feedback mode 2-1 can adapt to the beamformed CSI-RS mechanism in Rel-13.

It may be understood that, different from the foregoing case, there are four or eight antenna ports herein in the PUCCH 2-1. Different formats of the reports are properly combined, so that the solutions in the embodiments of the present invention can be better implemented.

With reference to any one of the first aspect, or the first to the thirteenth possible implementations of the first aspect, in a fourteenth possible implementation of the first aspect, before the reporting, by the UE, the RI, the BI, and the CQI on a physical uplink control channel PUCCH by using a report, the method further includes:

determining, by the UE, the quantity of CSI-RS resources; and determining, by the UE, a value of the RI and/or a value of the BI according to the quantity of spatial multiplexing layers and/or the quantity of CS-RS resources.

With reference to the fourteenth possible implementation of the first aspect, in a fifteenth possible implementation of the first aspect, the determining, by the UE, a value of the RI and/or a value of the BI according to the quantity of CSI-RS resources includes:

when the quantity of CSI-RS resources is 1, the value of the RI and/or the value of the BI are/is corresponding to a quantity of ports of the CSI-RS resources; or when the quantity of CSI-RS resources is greater than 1, the value of the RI and/or the value of the BI are/is corresponding to the quantity of CSI-RS resources, the quantity of spatial multiplexing layers, and/or a quantity of ports of the CSI-RS resources.

It should be noted that, when the quantity of CSI-RS resources is 1, reporting of the BI is selection and reporting of a CSI-RS port.

With reference to any one of the first aspect, or the first to the thirteenth possible implementations of the first aspect, in a sixteenth possible implementation of the first aspect, the method further includes:

determining, by the UE, the precoding type indicator PTI on the S subbands of the wideband on which the K CSI-RS resources are transmitted;

determining, by the UE, the quantity of CSI-RS resources; and determining, by the UE, a value of the RI, a value of the BI, and/or a value of the PTI according to the quantity of spatial multiplexing layers and/or the quantity of CS-RS resources.

A second aspect of the embodiments of the present invention further provides a method for measuring and feeding back channel state information, including:

receiving, by UE, a second channel state information report type configured by a base station and a CSI-RS resource delivered by the base station;

determining, by the UE, a rank indication RI, a PMI11, a PMI12, and a PMI2 on S subbands of a wideband on which the CSI-RS resource is transmitted, where S is an integer greater than or equal to 1, the PMI11 and the PMI12 are separately a one-dimension PMI of a first PMI in a double codebook structure, and the PMI2 is a second PMI in the double codebook structure;

calculating, by the UE, a channel quality indicator CQI on the S subbands; and reporting, by the UE, the RI, the PMI11, the PMI12, the PMI2, and the CQI on a physical uplink control channel PUCCH by using a report.

With reference to the second aspect, in a first possible implementation of the second aspect, a PUCCH feedback mode is PUCCH 1-1 or PUCCH 2-1, a format of the report used for reporting the PMI11 and/or the PMI12 includes a format 1, a format 2, and a format 3, a report in the format 1 is separate reporting of the PMI11 or the PMI12, a report in the format 2 is joint reporting of the PMI11 and the RI, or a report in the format 2 is joint reporting of the PMI12 and the RI, and a report in the format 3 is joint reporting of the PMI11, a wideband PMI2, and a wideband CQI, or a report in the format 3 is joint reporting of the PMI12, a wideband PMI2, and a wideband CQI.

With reference to the first possible implementation of the second aspect, in a second possible implementation of the second aspect, the method further includes:

setting different feedback submodes of the PUCCH feedback mode according to different PMIs jointly reported with the RI in the report in the format 2, where the PMI jointly reported with the RI is the PMI11 or the PMI12.

With reference to the second possible implementation of the second aspect, in a third possible implementation of the second aspect, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

With reference to the third possible implementation of the second aspect, in a fourth possible implementation of the second aspect, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

A third aspect of the embodiments of the present invention further provides a method for configuring and receiving a channel state information report, including:

configuring, by a base station, a first channel state information report type for user equipment UE;

transmitting, by the base station, K channel state information-reference signal CSI-RS resources to the UE, where K is an integer greater than or equal to 1; and receiving, by the base station, an RI, a BI, and a CQI on a physical uplink control channel PUCCH.

With reference to the third aspect, in a first possible implementation of the third aspect, in the report, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

With reference to the first possible implementation of the third aspect, in a second possible implementation of the third aspect, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

With reference to the third aspect, in a third possible implementation of the third aspect, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

With reference to the third possible implementation of the third aspect, in a fourth possible implementation of the third aspect, the PUCCH feedback mode is the PUCCH 1-1, there are two or four antenna ports, and the report in the format 3 is reporting of the wideband CQI and the wideband PMI.

With reference to the third possible implementation of the third aspect, in a fifth possible implementation of the third aspect, the PUCCH feedback mode is the PUCCH 1-1, there are four or eight antenna ports, and the report in the format 3 is joint reporting of the wideband CQI, the wideband PMI1, and the wideband PMI2.

With reference to the third aspect, in a sixth possible implementation of the third aspect, a PUCCH feedback mode is PUCCH 2-1, there are two or four antenna ports, a format of the report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2.

With reference to the third aspect, in a seventh possible implementation of the third aspect, a PUCCH feedback mode is PUCCH 2-1, there are four or eight antenna ports, a format of the report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2.

A fourth aspect of the present invention further provides a method for configuring and receiving a channel state information report, including:

configuring, by a base station, a second channel state information report type for user equipment UE;

transmitting, by the base station, a channel state information-reference signal CSI-RS resource to the UE; and receiving, by the base station, an RI, a PMI11, a PMI12, a PMI2, and a CQI on a physical uplink control channel PUCCH.

With reference to the fourth aspect, in a first possible implementation of the fourth aspect, a PUCCH feedback mode is PUCCH 1-1 or PUCCH 2-1, a format of a report used for reporting the PMI11 and/or the PMI12 includes a format 1, a format 2, and a format 3, a report in the format 1 is separate reporting of the PMI11 or the PMI12, a report in the format 2 is joint reporting of the PMI11 and the RI, or a report in the format 2 is joint reporting of the PMI12 and the RI, and a report in the format 3 is joint reporting of the PMI11, a wideband PMI2, and a wideband CQI, or a report in the format 3 is joint reporting of the PMI12, a wideband PMI2, and a wideband CQI.

With reference to the first possible implementation of the fourth aspect, in a second possible implementation of the fourth aspect, the method further includes:

setting different feedback submodes of the PUCCH feedback mode according to different PMIs jointly reported with the RI in the report in the format 2, where the PMI jointly reported with the RI is the PMI11 or the PMI12.

With reference to the second possible implementation of the fourth aspect, in a third possible implementation of the fourth aspect, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

With reference to the third possible implementation of the fourth aspect, in a fourth possible implementation of the fourth aspect, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

A fifth aspect of the present invention further provides user equipment, including:

a first receiving module, configured to receive a first channel state information report type configured by a base station and K channel state information-reference signal CSI-RS resources delivered by the base station, where K is an integer greater than or equal to 1;

a first processing module, configured to determine, according to the channel state information report type, a rank indication RI and/or a beamforming indication BI on S subbands of a wideband on which the K CSI-RS resources are transmitted, where S is an integer greater than or equal to 1, where the first processing module is further configured to calculate a channel quality indicator CQI on the S subbands; and a first sending module, configured to report the RI, the BI, and the CQI on a physical uplink control channel PUCCH by using a report.

With reference to the fifth aspect, in a first possible implementation of the fifth aspect, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

With reference to the first possible implementation of the fifth aspect, in a second possible implementation of the fifth aspect, a PUCCH feedback mode is PUCCH 1-1 or PUCCH 2-1, the PUCCH 1-1 and the PUCCH 2-1 each include a feedback submode 1 and a feedback submode 2, the BI is reported in the feedback submode 1 and the feedback submode by using reports in different formats, and the BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1.

With reference to the first possible implementation of the fifth aspect, in a third possible implementation of the fifth aspect, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

With reference to the first possible implementation of the fifth aspect, in a fourth possible implementation of the fifth aspect, a PUCCH feedback mode is PUCCH 1-1 or PUCCH 2-1, the report in the format 2 further includes a PMI, the PMI indicates a precoding matrix in a preset codebook, and the report that is in the format 2 and that includes the PMI is joint reporting of the RI and the PMI.

With reference to the fourth possible implementation of the fifth aspect, in a fifth possible implementation of the fifth aspect, the reporting period of the BI is M times the reporting period of the RI, and M is configured differently for different quantities of antenna ports, where M is an integer greater than or equal to 1.

With reference to the first possible implementation of the fifth aspect, in a sixth possible implementation of the fifth aspect, the first processing module is further configured to:

determine a precoding type indicator PTI on the S subbands of the wideband on which the K CSI-RS resources are transmitted, where the PTI indicates a precoding type; and the report in the format 1 further includes a PMI or the PTI, a report that is in the format 1 and that includes the PMI is joint reporting of the BI and the PMI, a report that is in the format 1 and that includes the PTI is joint reporting of the BI and the PTI, the report in the format 3 further includes the PTI, and the report that is in the format 3 and that includes the PTI is joint reporting of the BI, the RI, and the PTI.

With reference to the sixth possible implementation of the fifth aspect, in a seventh possible implementation of the fifth aspect, a PUCCH reporting format includes a format 3a, a format 6a, and a format 7, and a quantity of feedback bits of the report is determined according to at least one of a quantity of CSI-RS resources or a quantity of spatial multiplexing layers.

With reference to the seventh possible implementation of the fifth aspect, in an eighth possible implementation of the fifth aspect, the PMI in the report that is in the format 1 and that includes the PMI is first precoding $i_1$ in a double codebook structure or precoding i in a single codebook structure, and the first processing module is further configured to:

perform downsampling on the precoding i or the first precoding $i_1$, where the report that is in the format 1 and that includes the PMI is joint reporting of the BI and the precoding i or the BI and the first precoding it.

With reference to the fifth aspect, in a ninth possible implementation of the fifth aspect, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

With reference to the ninth possible implementation of the fifth aspect, in a tenth possible implementation of the fifth aspect, there are two or four antenna ports, and the report in the format 3 is reporting of the wideband CQI and the wideband PMI.

With reference to the ninth possible implementation of the fifth aspect, in an eleventh possible implementation of the fifth aspect, there are four or eight antenna ports, and the report in the format 3 is joint reporting of the wideband CQI, the wideband PMI1, and the wideband PMI2.

With reference to the fifth aspect, in a twelfth possible implementation of the fifth aspect, a PUCCH feedback mode is PUCCH 2-1, there are two or four antenna ports, a format of the report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2.

With reference to the fifth aspect, in a thirteenth possible implementation of the fifth aspect, a PUCCH feedback mode is PUCCH 2-1, there are four or eight antenna ports, a format of the report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2.

With reference to any one of the fifth aspect, or the first to the thirteenth possible implementations of the fifth aspect, in a fourteenth possible implementation of the fifth aspect, the first processing module is further configured to:

determine the quantity of CSI-RS resources; and determine a value of the RI and/or a value of the BI according to the quantity of spatial multiplexing layers and/or the quantity of CS-RS resources.

With reference to the fourteenth possible implementation of the fifth aspect, in a fifteenth possible implementation of the fifth aspect, the first processing module is specifically configured to:

when the quantity of CSI-RS resources is 1, the value of the RI and/or the value of the BI are/is corresponding to a quantity of ports of the CSI-RS resources; or when the quantity of CSI-RS resources is greater than 1, the value of the RI and/or the value of the BI are/is corresponding to the quantity of CSI-RS resources, the quantity of spatial multiplexing layers, and/or a quantity of ports of the CSI-RS resources.

With reference to any one of the fifth aspect, or the first to the thirteenth possible implementations of the fifth aspect, in a sixteenth possible implementation of the fifth aspect, the first processing module is further configured to:

determine the precoding type indicator PTI on the S subbands of the wideband on which the K CSI-RS resources are transmitted;

determine the quantity of CSI-RS resources; and determine a value of the RI, a value of the BI, and/or a value of the PTI according to the quantity of spatial multiplexing layers and/or the quantity of CS-RS resources.

A sixth aspect of the present invention further provides user equipment, including:

a second receiving module, configured to receive a second channel state information report type configured by a base station and a channel state information-reference signal CSI-RS resource delivered by the base station;

a second processing module, configured to determine a rank indication RI and precoding matrix indicators: a PMI11, a PMI12, and a PMI2 on S subbands of a wideband on which the CSI-RS resource is transmitted, where S is an integer greater than or equal to 1, the PMI11 and the PMI12 are separately a one-dimension PMI of a first PMI in a double codebook structure, and the PMI2 is a second PMI in the double codebook structure, where the second processing module is further configured to calculate a channel quality indicator CQI on the S subbands; and a second sending module, configured to report the RI, the PMI11, the PMI12, the PMI2, and the CQI on a physical uplink control channel PUCCH by using a report.

With reference to the sixth aspect, in a first possible implementation of the sixth aspect, a PUCCH feedback mode is PUCCH 1-1 or PUCCH 2-1, a format of the report used for reporting the PMI11 and/or the PMI12 includes a format 1, a format 2, and a format 3, a report in the format 1 is separate reporting of the PMI11 or the PMI12, a report in the format 2 is joint reporting of the PMI11 and the RI, or a report in the format 2 is joint reporting of the PMI12 and the RI, and a report in the format 3 is joint reporting of the PMI11, a wideband PMI2, and a wideband CQI, or a report in the format 3 is joint reporting of the PMI12, a wideband PMI2, and a wideband CQI.

With reference to the first possible implementation of the sixth aspect, in a second possible implementation of the sixth aspect, the second processing module is further configured to:

set different feedback submodes of the PUCCH feedback mode according to different PMIs jointly reported with the RI in the report in the format 2, where the PMI jointly reported with the RI is the PMI11 or the PMI12.

With reference to the second possible implementation of the sixth aspect, in a third possible implementation of the sixth aspect, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

With reference to the third possible implementation of the sixth aspect, in a fourth possible implementation of the sixth aspect, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

A seventh aspect of the present invention further provides a base station, including:

a first configuration module, configured to configure a first channel state information report type for user equipment UE;

a third sending module, configured to transmit K channel state information-reference signal CSI-RS resources to the UE, where K is an integer greater than or equal to 1; and a third receiving module, configured to receive an RI, a BI, and a CQI on a physical uplink control channel PUCCH.

With reference to the seventh aspect, in a first possible implementation of the seventh aspect, in a report, a reporting period of the BI is greater than or equal to a reporting period of the RI, a format of the report includes a format 1, a format 2, and a format 3, a report of the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

With reference to the first possible implementation of the seventh aspect, in a second possible implementation of the seventh aspect, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

With reference to the seventh aspect, in a third possible implementation of the seventh aspect, a PUCCH feedback mode is PUCCH 1-1, a format of a report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

With reference to the third possible implementation of the seventh aspect, in a fourth possible implementation of the seventh aspect, there are two or four antenna ports, and the report in the format 3 is reporting of the wideband CQI and the wideband PMI.

With reference to the third possible implementation of the seventh aspect, in a fifth possible implementation of the seventh aspect, there are four or eight antenna ports, and the report in the format 3 is joint reporting of the wideband CQI, the wideband PMI1, and the wideband PMI2.

With reference to the seventh aspect, in a sixth possible implementation of the seventh aspect, a PUCCH feedback mode is PUCCH 2-1, there are two or four antenna ports, a format of a report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2.

With reference to the seventh aspect, in a seventh possible implementation of the seventh aspect, a PUCCH feedback mode is PUCCH 2-1, there are four or eight antenna ports, a format of a report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2.

An eighth aspect of the embodiments of the present invention further provides a base station, including:

a second configuration module, configured to configure a second channel state information report type for user equipment UE;

a fourth sending module, configured to transmit a channel state information-reference signal CSI-RS resource to the UE; and a fourth receiving module, configured to receive an RI, a PMI11, a PMI12, a PMI2, and a CQI on a physical uplink control channel PUCCH.

With reference to the eighth aspect, in a first possible implementation of the eighth aspect, a PUCCH feedback mode is PUCCH 1-1 or PUCCH 2-1, a format of a report used for reporting the PMI11 and/or the PMI12 includes a format 1, a format 2, and a format 3, a report in the format 1 is separate reporting of the PMI11 or the PMI12, a report in the format 2 is joint reporting of the PMI11 and the RI, or a report in the format 2 is joint reporting of the PMI12 and the RI, and a report in the format 3 is joint reporting of the PMI11, a wideband PMI2, and a wideband CQI, or a report in the format 3 is joint reporting of the PMI12, a wideband PMI2, and a wideband CQI.

With reference to the first possible implementation of the eighth aspect, in a second possible implementation of the eighth aspect, the second configuration module is further configured to:

set different feedback submodes of the PUCCH feedback mode according to different PMIs jointly reported with the RI in the report in the format 2, where the PMI jointly reported with the RI is the PMI11 or the PMI12.

With reference to the second possible implementation of the eighth aspect, in a third possible implementation of the eighth aspect, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

With reference to the third possible implementation of the eighth aspect, in a fourth possible implementation of the eighth aspect, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

It may be learned from the foregoing technical solutions that the embodiments of the present invention have the following advantages: In the embodiments of the present invention, after receiving the K CSI-RS resources delivered by the base station and the first channel state information report type configured by the base station, the UE determines that the beamformed CSI-RS mechanism is used for reporting. Then the UE determines the RI and/or the BI on the S subbands of the bandwidth on which the K CSI-RS resources are transmitted, and calculates the CQI on the S subbands. The UE reports different content at different reporting moments. For example, the UE separately reports the RI, separately reports the BI, or jointly reports the RI and the BI, and then reports the CQI. Specific reporting may be determined according to the PUCCH feedback mode. Because the PUCCH feedback mode is redesigned, the BI can be smoothly reported, so as to adapt to the beamformed CSI-RS mechanism.

DESCRIPTION OF EMBODIMENTS

Embodiments of the present invention provide a method for measuring and feeding back channel state information, user equipment, and a base station, so as to add feedback of a BI by redesigning a PUCCH feedback mode. Therefore, the redesigned PUCCH feedback mode can adapt to a beamformed CSI-RS mechanism in Rel-13, and a new PUCCH feedback mode can be further provided to adapt to a non-precoded CSI-RS mechanism in Rel-13.

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. Details are separately described below.

In the specification, claims, and accompanying drawings of the present invention, the terms "first", "second", "third", "fourth", and so on (if existent) are intended to distinguish between similar objects but do not necessarily indicate a specific order. It should be understood that the data termed in such a way is interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device.

Figure 1:
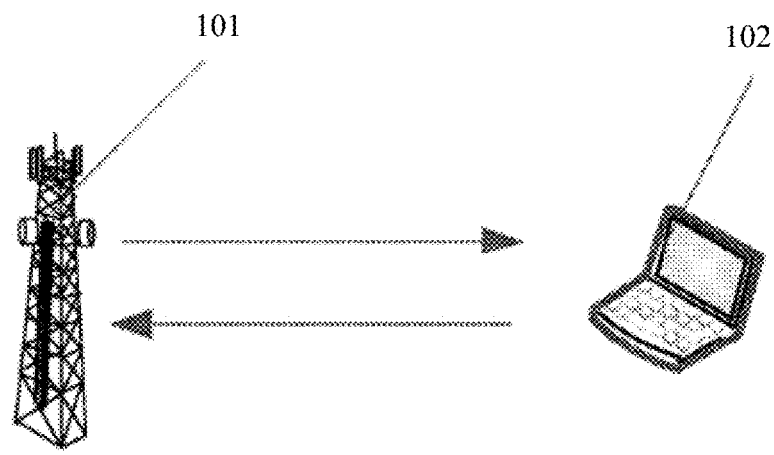
FIG. 1 is a schematic structural diagram of an LTE system.

The embodiments of the present invention are applied to wireless communications systems, for example, an LTE system and a WCDMA system. The LTE system is used as an example. Referring to FIG. 1, FIG. 1 is a schematic structural diagram of an LTE system, including a base station 101 and user equipment 102. Transmission performed by the base station to the user equipment is downlink transmission, and transmission performed by the user equipment to the base station is uplink transmission. One base station may communicate with a plurality of user equipments.

Figure 2:
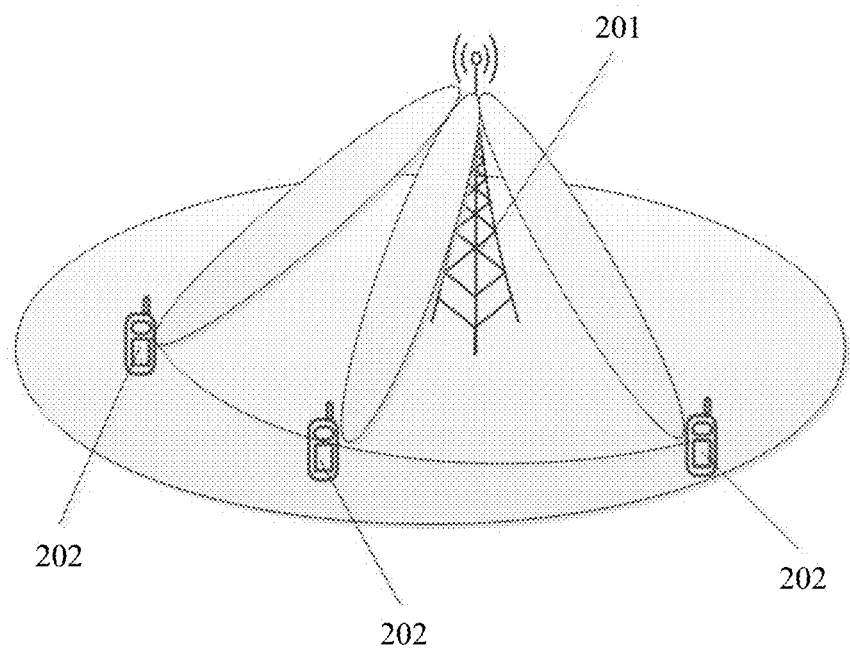
FIG. 2 is a schematic diagram of a DM-RS-based multi-stream transmission communications system in the prior art.

A multiple-antenna MIMO technology may be used in these wireless communications systems. For example, referring to FIG. 2, FIG. 2 is a schematic diagram of a DM-RS-based multi-stream transmission communications system in the prior art. The communications system includes an eNB 201 and a plurality of UEs 202. Only a two-dimensional beamformed signal is transmitted, that is, a transmit antenna is placed only horizontally, and can generate a beam only in a horizontal direction. To further improve multiple-antenna system performance, antennas are placed in both the horizontal direction and a vertical direction, so that beamforming can be performed in both the horizontal direction and the vertical direction. This is referred to as three-dimensional beamforming, that is, a 3D MIMO communications system.

The 3D MIMO is applied to different scenarios, for example, a 3D UMi scenario. In this scenario, the base station has a height of 10 meters, and users may be distributed in the first to the eighth floors in a building. In this case, the users are distributed in a relatively decentralized manner in a vertical direction. Therefore, more basic vertical vectors are required. In another typical application scenario 3D UMa, the base station has a height of 25 meters, and users are also distributed in the first to the eighth floors in a building, but all the users are distributed lower than the base station. Therefore, this scenario needs fewer basic vertical vectors than the UMi scenario. In a general 2D case, a codebook structure in a 2D antenna configuration mainly includes the following direct product form:

$$W = W_1 W_2 = \begin{bmatrix} X_1 \otimes X_2 & 0 \\ 0 & X_1' \otimes X_2' \end{bmatrix} \cdot W_2$$

$X_1$ and $X_2$ separately represent a horizontal matrix or a vertical matrix in a polarization direction, and typically, $X_1$ and $X_2$ may be vectors or matrices in a DFT form. $X_1'$ and $X_2'$ are horizontal matrices or vertical matrices in another polarization direction. $\otimes$ represents a Kronecker product or a direct product. $W_2$ has a same definition as $W_2$ in a current-standard double codebook structure, and is used to perform column selection on $W_1$ and perform an in-phase operation between the two polarization directions. However, $W_1$ includes the foregoing horizontal matrix (vector) and the foregoing vertical matrix (vector). In a 2D codebook structure, a quantity P of candidate basic matrices (vectors) in the codebook $W_1$ is determined according to both a quantity M of basic horizontal matrices (vectors) and a quantity N of basic vertical matrices (vectors), where P=M×N.

In both a beamformed CSI-RS mechanism and a non-precoded CSI-RS mechanism in Rel-13, a PUCCH feedback mode of the UE includes a PUCCH feedback mode $X_1$-$X_2$. When a value of $X_1$ is 1, a CQI that is fed back is a bandwidth CQI; or when a value of $X_1$ is 2, a CQI that is fed back is a subband CQI. When a value of $X_2$ is 0, a PMI is not fed back; or when a value of $X_2$ is 1, a PMI is fed back, and the PMI indicates a precoding matrix in a preset codebook. A specific feedback mode is shown in the following table.

TABLE 1

|  |  | Feedback type of a PMI | |
|---|---|---|---|
|  |  | No PMI | One PMI |
| PUCCH CQI feedback mode | Wideband type (Wideband CQI) | Mode 1-0 | Mode 1-1 |
|  | UE-selected type (Subband CQI) | Mode 2-0 | Mode 2-1 |

Specifically, in a prior-art PUCCH feedback mode 1-0, an RI and a CQI are reported in the following manner:

1. At an RI reporting moment (applicable only to a transmission mode 3):

The UE determines a value of the RI on S fixed subbands. The UE reports a report of a type 3. The report of the type 3 includes an RI.

2. At a CQI reporting moment:

The UE reports a report of a type 4. The report of the type 4 includes a value of a wideband CQI. The value of the wideband CQI is a value calculated on S fixed subbands. The value of the wideband CQI represents channel quality of a first codeword when the RI is greater than or equal to 1.

In the transmission mode 3, the CQI is calculated on the basis of a periodic RI reported most recently. In another transmission mode, the CQI is calculated on the basis of a rank 1.

It should be noted that, a prior-art PUCCH feedback mode 1-1 is similar to the foregoing feedback mode. A PMI may be reported at the RI reporting moment or the CQI reporting moment. Details are not described herein again.

In a prior-art PUCCH feedback mode 2-0, an RI and a CQI are reported in the following manner:

1. At an RI reporting moment (applicable only to a transmission mode 3):

The UE determines a value of the RI on S fixed subbands. Then the UE reports a report of a type 3. The report of the type 3 includes an RI.

2. At a wideband CQI reporting moment:

The UE reports a report of a type 4 at each reporting moment. The report of the type 4 includes a value of a wideband CQI. The value of the wideband CQI is a value calculated on S fixed subbands. The value of the wideband CQI represents channel quality of a first codeword when the RI is greater than or equal to 1.

In the transmission mode 3, the CQI is calculated on the basis of a periodic RI reported most recently. In another transmission mode, the CQI is calculated on the basis of a rank 1.

3. At a moment at which the CQI on a subband selected by the UE is reported:

The UE selects a preferred subband from a set of at least one subband on each of J BPs.

The UE reports a report of a type 1. The report of the type 1 includes a value of the CQI. The value of the CQI reflects only channel transmission on the selected subband on the BP, and information about the preferred subband is indicated by using L bits. Reports of the type 1 on all the BPs are successively reported at subsequent reporting moments. The value of the CQI represents channel quality of a first codeword when the RI is greater than or equal to 1.

It should be noted that, a prior-art PUCCH feedback mode 2-1 is similar to the foregoing feedback mode. A PMI may be reported at the RI reporting moment, the wideband CQI reporting moment, or the subband CQI reporting moment. Details are not described herein again.

It may be learned that, for the beamformed CSI-RS mechanism in Rel-13, the foregoing feedback mode does not relate to a feedback layout of a BI. Therefore, the foregoing feedback mode cannot be applied to the mechanism. In the non-precoded CSI-RS mechanism in Rel-13, because a new 2D codebook is used, a feedback layout of a PMI11, a PMI12, and a PMI2 in the codebook needs to be considered for feedback. The PMI11 and the PMI12 each are a one-dimension PMI of a PMI1 in the codebook.

Embodiment 1

Figure 3:
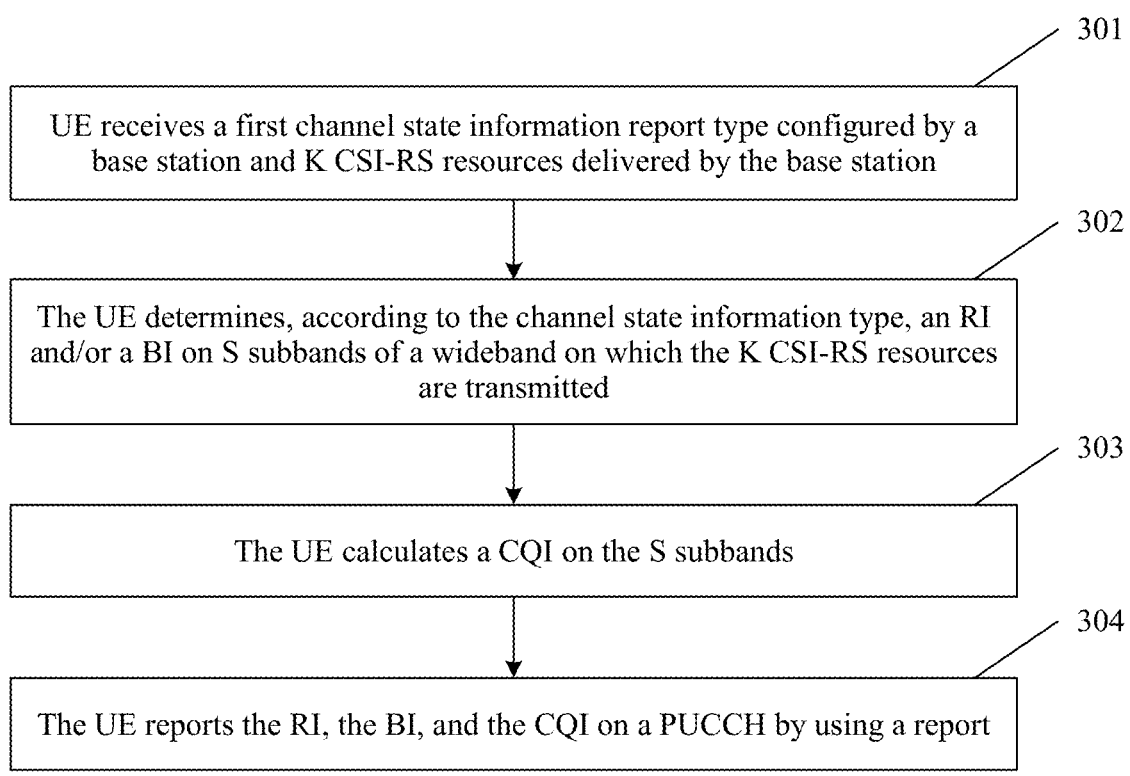
FIG. 3 is an embodiment diagram of a measurement and feedback method according to an embodiment of the present invention.

For a beamformed CSI-RS mechanism, an embodiment of the present invention provides a method for measuring and feeding back channel state information. Referring to FIG. 3, FIG. 3 is an embodiment diagram of a measurement and feedback method according to an embodiment of the present invention. The method may include the following steps.

301. UE receives a first channel state information report type configured by a base station and K CSI-RS resources delivered by the base station.

K is an integer greater than or equal to 1.

It should be noted that the first channel state information report type in this embodiment of the present invention is a type of channel state information fed back by the UE in the beamformed CSI-RS mechanism, that is, a channel state information report class B.

It may be understood that the UE first learns, according to the first channel state information report type configured by the base station, a type of channel state information that needs to be fed back. The feedback herein is performed according to the beamformed CSI-RS mechanism. In the mechanism, the UE receives the K CSI-RS resources delivered by the base station, so that the UE can report an optimal beam according to the CSI-RS resources, that is, determine an optimal BI.

302. The UE determines, according to the channel state information report type, an RI and/or a BI on S subbands of a wideband on which the K CSI-RS resources are transmitted.

S is an integer greater than or equal to 1.

It should be noted that the UE may determine three types of indication information according to the K CSI-RS resources before a reporting moment. The three types of indication information are an RI, a BI, and an RI and a BI. Specifically, the indication information may be different according to the RI, the BI, or the RI and the BI that need to be reported at a subsequent reporting moment.

303. The UE calculates a CQI on the S subbands.

It may be understood that, after determining the RI and/or the BI, the UE calculates the CQI on the S subbands. A value of the CQI reflects quality of a selected channel.

304. The UE reports the RI, the BI, and the CQI on a PUCCH by using a report.

After determining the RI, the BI, and the CQI, the UE reports the RI, the BI, and the CQI on the PUCCH by using the report.

For example, a new transmission mode: a PUCCH feedback mode in the beamformed CSI-RS mechanism in Rel-13 may be a PUCCH mode x-0. The PUCCH feedback mode x-0 may be an existing PUCCH mode 1-0 or an existing PUCCH mode 2-0. Optionally, the feedback mode may be a feedback mode (for example, a PUCCH mode x-0). Feedback content of the feedback mode includes at least one of an RI or a BI, and a corresponding CQI.

The CQI may be a wideband CQI, or may be a wideband CQI and a subband CQI. This is not limited herein.

The PUCCH feedback mode x-0 is specifically described as follows:

A rank indication RI and/or a beamforming indication BI and a channel quality indicator CQI are reported in the following manner:

At a BI or RI reporting moment (applicable only to an FD-MIMO transmission mode, for example, TM11, or applicable to a scenario in which the channel state information report class B is configured for the user equipment):

a user equipment determines a value of the RI and/or a value of the BI on S fixed subbands; and the user equipment reports a report of a type x. The report of the type x includes an RI and/or a BI.

At a CQI reporting moment:

A user equipment reports a report of a type 4. The report of the type 4 includes a value of the wideband CQI. The value of the wideband CQI is a value calculated on S fixed subbands. The value of the wideband CQI represents channel quality of a first codeword when the RI is greater than or equal to 1.

Optionally, before the reporting, by the UE, the RI, the BI, and the CQI on a physical uplink control channel PUCCH by using a report, the method further includes:

determining, by the UE, a quantity of CSI-RS resources; and determining, by the UE, a value of the RI and/or a value of the BI according to a quantity of spatial multiplexing layers and/or the quantity of CS-RS resources.

The reporting mode is applicable to the following case.

K (K>1) CSI-RS resources and a channel state information report type 1, for example, a CSI report class B are configured for the user equipment. Each of the K CSI-RS resources is corresponding to one antenna port. In this case, CSI of the user equipment may be reported in the foregoing feedback mode.

For example, optionally, in the FD-MIMO transmission mode, which may be optionally a transmission mode on the basis of a conventional transmission mode (Transmission Mode, TM) 8, TM9, TM10, or a new transmission mode TM11, the CQI is calculated on the basis of a periodic RI and/or BI reported most recently. In another transmission mode, the CQI is calculated on the basis of a rank 1 and a default value of the BI.

A newly defined PUCCH report type x and PUCCH report type 4 may be shown in Table 2 to Table 4.

TABLE 2

| PUCCH format | Report | Mode State | Feedback mode x-0 (bits/BP) | Feedback mode 1-0 (bits/BP) | Feedback mode 2-0 (bits/BP) |
|---|---|---|---|---|---|
| x | RI | Two-layer spatial multiplexing | 1 | 1 | 1 |
| | | Four-layer spatial multiplexing | 2 | 2 | 2 |
| | | Eight-layer spatial multiplexing | 3 | NA | NA |
| 4 | Wideband CQI | RI = 1 or RI >1 | 4 | 4 | 4 |

It may be learned from Table 2 that a quantity of RI feedback bits is related to a quantity of spatial multiplexing layers. A larger quantity of spatial multiplexing layers indicates a larger quantity of feedback bits.

Optionally, the determining, by the UE, a value of the RI and/or a value of the BI according to the quantity of CSI-RS resources includes:

when the quantity of CSI-RS resources is 1, the value of the RI and/or the value of the BI are/is corresponding to a quantity of ports of the CSI-RS resources; or when the quantity of CSI-RS resources is greater than 1, the value of the RI and/or the value of the BI are/is corresponding to the quantity of CSI-RS resources, the quantity of spatial multiplexing layers, and/or a quantity of ports of the CSI-RS resources.

For example, Table 3 shows quantities of BI feedback bits for different quantities of ports, and Table 4 shows quantities of BI feedback bits for different values of K. A BI herein is a port selection indication. When the quantity of CSI-RS resources is 1, that is, K=1, the BI indicates selection of a port of the CSI-RS resources.

TABLE 3

| PUCCH format | Report | Mode State | Feedback mode x-0 (bits/BP) | Feedback mode 1-0 (bits/BP) | Feedback mode 2-0 (bits/BP) |
|---|---|---|---|---|---|
| x | BI | One port | 1 | 1 | 1 |
|   |    | Two ports | 2 | 2 | 2 |
|   |    | Four ports | 3 | NA | NA |
| 4 | Wideband CQI | RI = 1 or RI >1 | 4 | 4 | 4 |

It may be learned from Table 3 that, when K=1, a quantity of BI feedback or reporting bits is related to a quantity of antenna ports corresponding to the CSI-RS resources.

TABLE 4

| PUCCH format | Report | Mode State | Feedback mode x-0 (bits/BP) | Feedback mode 1-0 (bits/BP) | Feedback mode 2-0 (bits/BP) |
|---|---|---|---|---|---|
| x | BI | 1 < K <= 4 | 2 | 2 | 2 |
|   |    | 4 < K <= 8 | 3 | 3 | 3 |
| 4 | Wideband CQI | RI = 1 or RI >1 | 4 | 4 | 4 |

It may be learned from Table 4 that, when K>1, a quantity of BI feedback or reporting bits is related to a quantity K of CSI-RS resources.

In addition, in this feedback mode and another PUCCH reporting mode, for example, a PUCCH feedback mode 1-1 or a PUCCH feedback mode 2-1, the BI and the RI may be jointly reported.

Optionally, the UE determines a precoding type indicator PTI on the S subbands of the wideband on which the K CSI-RS resources are transmitted.

The UE determines the quantity of CSI-RS resources.

The UE determines a value of the RI, a value of the BI, and/or a value of the PTI according to the quantity of spatial multiplexing layers and/or the quantity of CS-RS resources.

That is, when the reported report further includes the PTI, the value of the PTI may be determined according to the quantity of spatial multiplexing layers and/or the quantity of CS-RS resources. This is similar to determining the value of the BI above, and details are not described herein again.

Optionally, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2. The format 1, the format 2, and the format 3 may be properly combined to form a complete reporting period.

For another example, reporting modes other than the PUCCH mode 1-0 and the PUCCH mode 2-0, for example, the PUCCH feedback mode 1-1 and the PUCCH feedback mode 2-1, each include a feedback submode 1 and a feedback submode 2. The BI is reported in the feedback submode 1 and the feedback submode by using reports in different formats. The BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1.

It may be understood that the PUCCH feedback mode 1-1 and the PUCCH feedback mode 2-1 each may include two different feedback submodes, that is, the feedback submode 1 and the feedback submode 2. The BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1. A reporting format of the report is flexibly configured. Although reporting time sequences are the same, reporting formats used for reporting at each reporting moment may be different. Therefore, a feedback mode, for example, the PUCCH feedback mode 1-1 or the PUCCH feedback mode 2-1, may be divided into a feedback submode 1 and a feedback submode 2 according to different reporting formats at each reporting moment, so that a PUCCH feedback mode can be configured more flexibly, user equipment feedback can have a higher degree of freedom and can be more flexible, and scalability of the solution in this embodiment of the present invention can be improved.

Optionally, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

For example, a case in which the PMI is reported by using a single codebook structure is used in the PUCCH feedback mode 2-1. In this case, two feedback submodes for BI reporting may be shown in Table 5.

TABLE 5

| Feedback submode 1 | BI | RI | CQI + PMI | ... | CQI + PMI |
| Feedback submode 2 | RI + BI | | CQI + PMI | ... | CQI + PMI |

It may be learned from Table 5 that, in the feedback submode 1, the BI is separately reported, that is, a reporting manner of the report in the format 1 is used, but in the feedback submode 2, the BI and the RI are jointly reported; and after the BI, the RI, or the BI and the RI are reported, a PMI in a single codebook and a CQI are reported.

Optionally, a PUCCH feedback mode is PUCCH 1-1 or PUCCH 2-1, the report in the format 2 further includes a PMI, the PMI indicates a precoding matrix in a preset codebook, and the report that is in the format 2 and that includes the PMI is joint reporting of the RI and the PMI.

For another example, the PUCCH feedback mode 2-1 is used. A codebook is of a double codebook structure. The PMI and the RI are jointly reported. The two feedback submodes are specifically shown in Table 6.

TABLE 6

| Feedback submode 1 | BI | RI + PMI12 | CQI + PMI11 + PMI2 | ... | CQI + PMI11 + PMI2 |
|---|---|---|---|---|---|
| Feedback submode 2 | BI | RI + PMI11 | CQI + PMI12 + PMI2 | ... | CQI + PMI12 + PMI2 |

It may be learned from Table 6 that, in the feedback submode 1, the BI is separately reported, the RI and a one-dimension PMI, that is, a PMI12, of a PMI in the double codebook structure are jointly reported, and a used reporting format is the format 2, but in the feedback submode 2, the RI and an another-dimension PMI, that is, a PMI11, of the PMI in the double codebook structure are jointly reported; and after the BI, the RI, and the PMI11 or the PMI12 are reported, the CQI, the PMI11, and a PMI2 are reported.

A reporting manner of jointly reporting the PMI11 and the RI or jointly reporting the PMI12 and the RI is freely configured according to a difference between a quantity of feedback bits of the PMI11 and a quantity of feedback bits of the PMI12 in each codebook configuration. For example, when the quantity of feedback bits of the PMI11 is less than or equal to the quantity of feedback bits of the PMI12, the RI and the PMI11 are jointly encoded; or when the quantity of feedback bits of the PMI12 is less than or equal to the quantity of feedback bits of the PMI11, the RI and the PMI12 are jointly encoded.

In the foregoing example, the reporting period of the BI is M times the reporting period of the RI, and M is configured differently for different quantities of antenna ports, where M is an integer greater than or equal to 1.

Optionally, the UE determines a precoding type indicator PTI on the S subbands of the wideband on which the K CSI-RS resources are transmitted. The PTI indicates a precoding type.

The report in the format 1 further includes a PMI or the PTI, a report that is in the format 1 and that includes the PMI is joint reporting of the BI and the PMI, a report that is in the format 1 and that includes the PTI is joint reporting of the BI and the PTI, the report in the format 3 further includes the PTI, and the report that is in the format 3 and that includes the PTI is joint reporting of the BI, the RI, and the PTI.

For example, the report in the format 1 further includes the PMI or the PTI, and reporting formats and bit quantities of the PMI or the PTI in various PUCCH feedback modes are shown in Table 7.

TABLE 7

| PUCCH format | Report | Mode State | PUCCH feedback mode | | | |
|---|---|---|---|---|---|---|
| | | | Feedback mode 1-1 (bits/BP) | Feedback mode 2-1 (bits/BP) | Feedback mode 1-0 (bits/BP) | Feedback mode 2-0 (bits/BP) |
| Y (6') | BI/PTI | Four/eight antenna ports and K ≤2; or K ≤2 | NA | 2 | NA | NA |
| | | Four/eight antenna ports, and 2 < K ≤ 4; or 2 < K ≤ 4 | NA | 3 | NA | NA |
| | | Four/eight antenna ports, and 4 < K ≤ 8; or 4 < K ≤ 8 | NA | 4 | NA | NA |
| X (5') | BI/PMI | Two antenna ports and K ≤2, and/or L ≤2, where L is a quantity of spatial multiplexing layers | NA | 3 | NA | NA |
| | | Two antenna ports and 2 < K ≤ 4, and/or 2 < L ≤ 4, where L is a quantity of spatial multiplexing layers | NA | 4 | NA | NA |
| | | Four/eight antenna ports and 2 < K ≤ 4; or two antenna ports and 4 < K ≤ 8; and/or 2 < L ≤ 4, where L is a quantity of spatial multiplexing layers | NA | 4 | NA | NA |

TABLE 7-continued

| PUCCH format | Report | Mode State | Feedback mode 1-1 (bits/BP) | Feedback mode 2-1 (bits/BP) | Feedback mode 1-0 (bits/BP) | Feedback mode 2-0 (bits/BP) |
|---|---|---|---|---|---|---|
| | | Four/eight antenna ports and $4 < K \leq 8$; and/or $L > 4$, where L is a quantity of spatial multiplexing layers | 5 | | | |

It may be learned from Table 7 that a quantity of feedback bits of the report that is in the format 1 and that includes the PTI or the PMI is related to at least one of a quantity of antenna ports, a quantity of spatial multiplexing layers, or a quantity of CSI-RS resources.

It may be understood that when the report in the format 1 includes the PMI or the PTI, the BI and the PMI or the BI and the PTI are jointly reported. When the report in the format 3 includes the PTI, the report in the format 3 is joint reporting of the BI, the RI, and the PTI.

Optionally, a PUCCH reporting format includes a format 3a, a format 6a, and a format 7, and a quantity of feedback bits of the report is determined according to at least one of a quantity of CSI-RS resources or a quantity of spatial multiplexing layers.

For example, a case in which the reporting format includes the format 3a, the format 6a, and the format 7 is shown in Table 8.

TABLE 8

| PUCCH format | Report | Mode State | Feedback mode 1-1 (bits/BP) | Feedback mode 2-1 (bits/BP) | Feedback mode 1-0 (bits/BP) | Feedback mode 2-0 (bits/BP) |
|---|---|---|---|---|---|---|
| 3a | BI/RI | $K \leq 2$ and two-layer spatial multiplexing | 2 | 2 | NA | NA |
| | | $2 < K \leq 4$ and two-layer spatial multiplexing; or $K \leq 2$ and four-layer spatial multiplexing | 3 | 3 | NA | NA |
| | | $2 < K \leq 4$ and four-layer spatial multiplexing; or $K \leq 2$ and eight-layer spatial multiplexing; or $K > 4$ and two-layer spatial multiplexing | 4 | 4 | NA | NA |
| | | $2 < K \leq 4$ and eight-layer spatial multiplexing; or $K > 4$ and four-layer spatial multiplexing | 5 | 5 | NA | NA |
| 6a | BI/RI/PTI | $K \leq 2$ and two-layer spatial multiplexing | 3 | 3 | NA | NA |
| | | $2 < K \leq 4$ and two-layer spatial multiplexing; or $K \leq 2$ and four-layer spatial multiplexing | 4 | 4 | NA | NA |
| | | $2 < K \leq 4$ and four-layer spatial multiplexing; or $K \leq 2$ and eight-layer spatial multiplexing; or $K > 4$ and two-layer spatial multiplexing | 5 | 5 | NA | NA |
| | | $2 < K \leq 4$ and eight-layer spatial multiplexing; or $K > 4$ and four-layer spatial multiplexing | 6 | 6 | NA | NA |

TABLE 8-continued

| PUCCH format | Report | Mode State | PUCCH feedback mode | | | |
| --- | --- | --- | --- | --- | --- | --- |
| | | | Feedback mode 1-1 (bits/BP) | Feedback mode 2-1 (bits/BP) | Feedback mode 1-0 (bits/BP) | Feedback mode 2-0 (bits/BP) |
| 7 | BI | K ≤ 2 | 1 | 1 | NA | NA |
| | | 2 < K ≤ 4 | 2 | 2 | NA | NA |
| | | K > 4 | 3 | 3 | NA | NA |

It may be learned from Table 8 that a quantity of feedback bits in each report type is related to at least one of a quantity K of CSI-RS resources configured by the base station or a quantity L of spatial multiplexing layers.

Alternatively, a case in which the reporting format includes the format 3a, the format 6a, and the format 7 may be shown in Table 9.

TABLE 9

| PUCCH format | Report | Mode State | PUCCH feedback mode | | | |
| --- | --- | --- | --- | --- | --- | --- |
| | | | Feedback mode 1-1 (bits/BP) | Feedback mode 2-1 (bits/BP) | Feedback mode 1-0 (bits/BP) | Feedback mode 2-0 (bits/BP) |
| 3a | BI/RI | K ≤ 2 and two-layer spatial multiplexing | 2 | 2 | NA | NA |
| | | 2 < K ≤ 4 and two-layer spatial multiplexing; or K ≤ 2 and four-layer spatial multiplexing | 3 | 3 | NA | NA |
| | | 2 < K ≤ 4 and four-layer spatial multiplexing; or K ≤ 2 and eight-layer spatial multiplexing; or K > 4 and two-layer spatial multiplexing | 4 | 4 | NA | NA |
| 6a | BI/RI/PTI | K ≤ 2 and two-layer spatial multiplexing | 3 | 3 | NA | NA |
| | | 2 < K ≤ 4 and two-layer spatial multiplexing; or K ≤ 2 and four-layer spatial multiplexing | 4 | 4 | NA | NA |
| | | 2 < K ≤ 4 and four-layer spatial multiplexing; or K ≤ 2 and eight-layer spatial multiplexing; or K > 4 and two-layer spatial multiplexing | 5 | 5 | NA | NA |
| 7 | BI | K ≤ 2 | 1 | 1 | NA | NA |
| | | 2 < K ≤ 4 | 2 | 2 | NA | NA |
| | | K > 4 | 3 | 3 | NA | NA |

In Table 9, a maximum quantity of feedback bits in each report type is limited to 5 (the same as a maximum quantity 5 of feedback bits for joint reporting of the RI and other CSI in the prior art), so that reliability of RI transmission can be ensured. A UCI field for jointly reporting the BI and the RI, a UCI field for jointly reporting the BI, the RI, and the PTI, and a specific quantity of feedback bits are described in detail in Table 10-1 and Table 10-2.

TABLE 10-1

| | Quantity of bits | | | | | | |
|---|---|---|---|---|---|---|---|
| | Not more than two spatial multiplexing layers | | | Not more than four spatial multiplexing layers | | Not more than eight spatial multiplexing layers | |
| Field | $K \leq 2$ | $2 < K \leq 4$ | $K > 4$ | $K \leq 2$ | $2 < K \leq 4$ | $K \leq 2$ | $2 < K \leq 4$ |
| RI | 1 | 1 | 1 | 2 | 2 | 3 | — |
| BI | 1 | 2 | 3 | 1 | 2 | 1 | — |

Table 10-1 shows the UCI field for jointly reporting the BI and the RI and a specific quantity of feedback bits in the case of a CSI class B and K>1.

TABLE 10-2

| | Quantity of bits | | | | | | |
|---|---|---|---|---|---|---|---|
| | Not more than two spatial multiplexing layers | | | Not more than four spatial multiplexing layers | | Not more than eight spatial multiplexing layers | |
| Field | $K \leq 2$ | $2 < K \leq 4$ | $K > 4$ | $K \leq 2$ | $2 < K \leq 4$ | $K \leq 2$ | $2 < K \leq 4$ |
| RI | 1 | 1 | 1 | 2 | 2 | 3 | 3 |
| BI | 1 | 2 | 3 | 1 | 2 | 1 | — |
| PTI | 1 | 1 | 1 | 1 | 1 | 1 | 1 |

Table 10-2 shows the UCI field for jointly reporting the BI, the RI, and the PTI and a specific quantity of feedback bits in the case of a CSI class B and K>1.

Optionally, the PMI in the report that is in the format 1 and that includes the PMI is first precoding $i_1$ in a double codebook structure or precoding i in a single codebook structure, and the method further includes:

performing downsampling on the precoding i or the first precoding $i_1$.

The report that is in the format 1 and that includes the PMI is joint reporting of the BI and the precoding i or the BI and the first precoding $i_1$.

For example, as shown in Table 11, Table 11 shows an example in which the BI and $i_1$ are jointly encoded into 4 bits.

TABLE 11

| | BI | | $i_1$ | | RI |
|---|---|---|---|---|---|
| K | #bits | values | #bits | values | #bits |
| 1 | 1 | {0} | 3 | {0, 2, 4, 6, 8, 12, 14} | 1 |
| 2 | 1 | {0, 1} | 3 | {0, 2, 4, 6, 8, 12, 14} | 2 |
| 3 | 2 | {0, 1, 2} | 2 | {0, 2, 4, 6} | 3 |
| 4 | 2 | {0, 1, 2, 3} | 2 | {0, 2, 4, 6} | 4 |
| 5 | 3 | {0, 1, 2, 3, 4} | 1 | {0, 2} | 5 |
| 6 | 3 | {0, 1, 2, 3, 4, 5} | 1 | {0, 2} | 6 |
| 7 | 3 | {0, 1, 2, 3, 4, 5, 6} | 1 | {0, 2} | 7 |
| 8 | 3 | {0, 1, 2, 3, 4, 5, 6, 7} | 0 | {0} | 8 |

It may be understood that the PMI may be the first precoding $i_1$ in the double codebook structure or the precoding i in the single codebook structure. Downsampling is performed on the precoding i or the first precoding $i_1$. The downsampling indicates that sampling is performed on a sample sequence once every several samples, to obtain a new sequence. The new sequence is obtained after downsampling is performed on the original sequence. Downsampling processing may be performed on the sample i or $i_1$ herein. Then the sample i or $i_1$ may be included in the report that is in the format 1 and that includes the PMI. That is, the BI and i are jointly reported, or the BI and $i_1$ are jointly reported.

Optionally, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook or a component of the precoding matrix.

Figure 4:
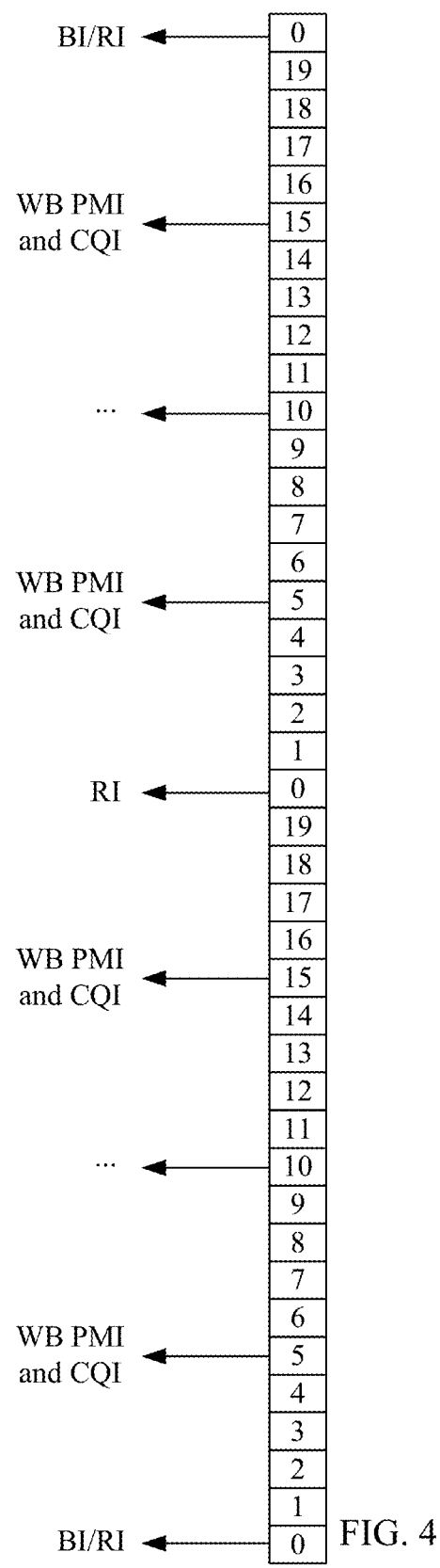
FIG. 4 is another embodiment diagram of a measurement and feedback method according to an embodiment of the present invention.

For example, referring to FIG. 4, FIG. 4 is another embodiment diagram of a measurement and feedback method according to an embodiment of the present invention. It may be learned that, in the foregoing PUCCH 1-1, there are two or four antenna ports, and the report in the format 3 is reporting of the wideband CQI and the wideband PMI. It may be understood that, if there are two or four antenna ports, the report in the format 3 is reporting of the wideband CQI and the wideband PMI. Specifically, a reporting sequence is as follows: 1. The BI and the RI are jointly reported. 2. The wideband PMI and the wideband CQI are reported. 3. The wideband CQI and the wideband PMI are reported. 4. The RI is separately reported. 5. The wideband PMI and the wideband CQI are reported. 6. The wideband PMI and the wideband CQI are reported. 7. The BI and the RI are jointly reported. Reporting in one complete period is completed according to a sequence from 1 to 6. A plurality of report reporting processes may be further included between 2 and 3 and between 5 and 6.

Figure 5:
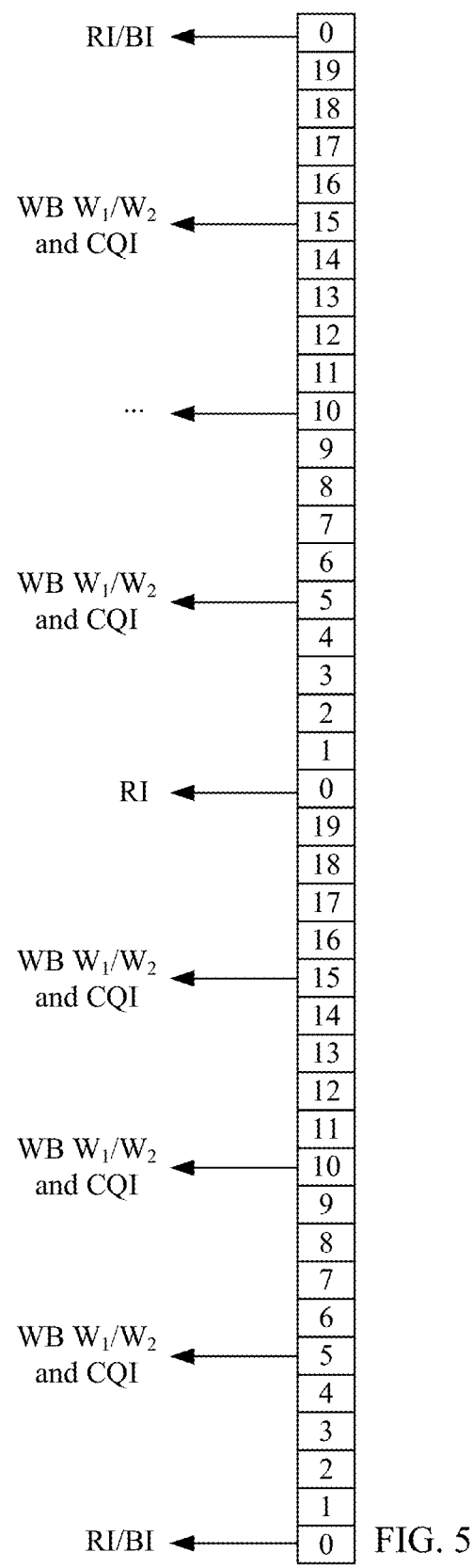
FIG. 5 is another embodiment diagram of a measurement and feedback method according to an embodiment of the present invention.

For another example, referring to FIG. 5, FIG. 5 is another embodiment diagram of a measurement and feedback method according to an embodiment of the present invention. It may be learned that, in the foregoing PUCCH 1-1, there are four or eight antenna ports, and the report in the format 3 is joint reporting of the wideband CQI, the wideband PMI1, and the wideband PMI2. It may be understood that, if there are four or eight antenna ports, the report in the format 3 is joint reporting of the wideband CQI, the wideband PMI1, and the wideband PMI2. Specifically, a reporting sequence is as follows: 1. The BI and the RI are jointly reported. 2. The wideband PMI1, the wideband PMI2, and the wideband CQI are jointly reported. 3. The wideband PMI1, the wideband PMI2, and the wideband CQI are jointly reported. 4. The wideband PMI1, the wideband PMI2, and the wideband CQI are jointly reported. 5. The RI is separately reported. 6. The wideband PMI1, the wideband PMI2, and the wideband CQI are jointly reported. 7. The wideband PMI1, the wideband PMI2, and the wideband CQI are jointly reported. That is, reporting in one complete period is completed according to the sequence from 1 to 7. A plurality of report reporting processes may be further included between 6 and 7.

Figure 6:
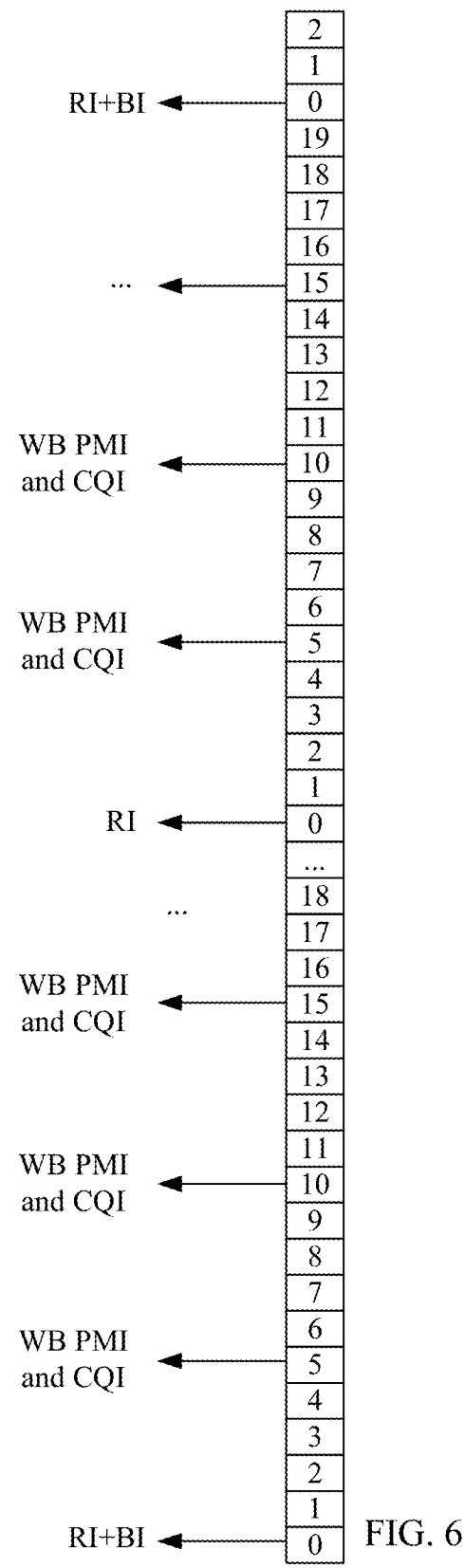
FIG. 6 is another embodiment diagram of a measurement and feedback method according to an embodiment of the present invention.

Optionally, referring to FIG. 6, FIG. 6 is another embodiment diagram of a measurement and feedback method according to an embodiment of the present invention. It may be learned that, in the foregoing PUCCH 2-1, there are two or four antenna ports, a format of the report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2. Specifically, a reporting sequence is as follows: 1. The BI and the RI are jointly reported. 2. The wideband PMI and the wideband CQI are jointly reported. 3. The wideband PMI and the wideband CQI are jointly reported. 4. The wideband PMI and the wideband CQI are jointly reported. 5. The RI is separately reported. 6. The wideband PMI and the wideband CQI are jointly reported. 7. The wideband PMI and the wideband CQI are jointly reported. That is, reporting in one complete period is completed according to the sequence from 1 to 7. A plurality of report reporting processes may be further included between 4 and 5 and between 7 and a next period.

Figure 7:
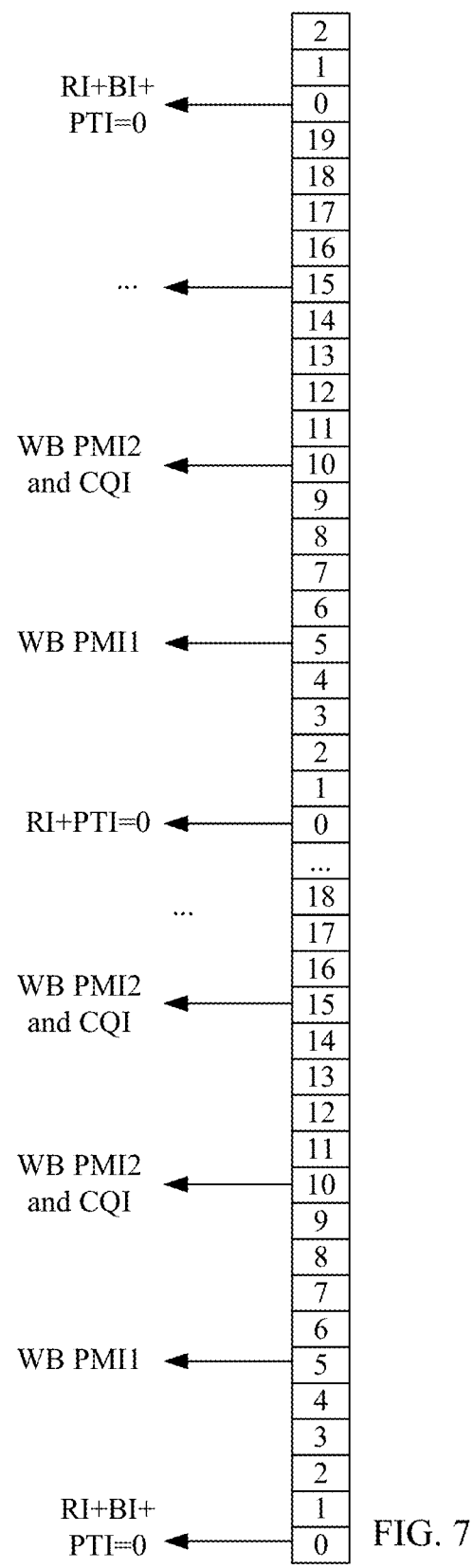
FIG. 7 is another embodiment diagram of a measurement and feedback method according to an embodiment of the present invention.

Optionally, referring to FIG. 7, FIG. 7 is another embodiment diagram of a measurement and feedback method according to an embodiment of the present invention. It may be learned that, in the foregoing PUCCH 2-1, there are four or eight antenna ports, a format of the report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2. Specifically, a reporting sequence is as follows: 1. The BI, the RI, and the PTI are jointly reported. 2. The wideband PMI1 is reported. 3. The wideband PMI2 and the wideband CQI are jointly reported. 4. The wideband PMI1 is reported. 5. The wideband PMI2 and the wideband CQI are jointly reported. 6. The RI and the PTI are jointly reported. 7. The wideband PMI1 is reported. 8. The wideband PMI2 and the wideband CQI are jointly reported, where PTI=0. That is, reporting in one complete period is completed according to the sequence from 1 to 8.

Alternatively, a reporting sequence is as follows: 1. The BI, the RI, and the PTI are jointly reported. 2. The wideband PMI2 and the wideband CQI are jointly reported. 3. The subband PMI2 and the subband CQI are jointly reported. 4. The subband PMI2 and the subband CQI are jointly reported. 5. The RI and the PTI are jointly reported. 6. The wideband PMI2 and the wideband CQI are jointly reported. 7. The subband PMI2 and the subband CQI are jointly reported, where PTI=1. That is, reporting in one complete period is completed according to the sequence from 1 to 7.

If a reporting period of the wideband CQI and the wideband PMI is $N_{pd}$, a moment at which the wideband CQI/PMI is reported is a subframe that meets the following condition, where $n_f$ and $n_s$ are respectively a frame number and a timeslot number, and $N_{OFFSET,CQI}$ is an offset of an initial moment at which the CQI/PMI is reported:

$$(10 \times n_f + \lfloor n_s/2 \rfloor - N_{OFFSET,CQI}) \bmod (N_{pd}) = 0$$

If a reporting period of the RI is an integer multiple of $N_{pd}$, a moment at which the RI is reported is a subframe that meets the following condition, where $n_f$ and $n_s$ are respectively a frame number and a timeslot number, $N_{OFFSET,CQI}$ is an offset of an initial moment at which the CQI/PMI is reported, $N_{OFFSET,RI}$ is an offset of an initial moment at which the RI is reported; and $M_{RI}$ ($M_{RI} \geq 1$) is an integer multiple of a reporting period of the CQI and the PMI:

$$(10 \times n_f + \lfloor n_s/2 \rfloor - N_{OFFSET,CQI} - N_{OFFSET,RI}) \bmod (N_{pd} \cdot M_{RI}) = 0$$

If a reporting period of the BI and the RI or the BI is an integer multiple of a reporting period of the RI, a moment at which the BI and the RI or the BI is reported is a subframe that meets the following condition, where $n_f$ and $n_s$ are respectively a frame number and a timeslot number, $N_{OFFSET,CQI}$, $N_{OFFSET,RI}$, and $M_{RI}$ have the same meanings as the foregoing, $M_{BI}$ ($M_{BI} \geq 1$) is an integer multiple of a value obtained after the reporting period of the BI and the RI or the BI is divided by the reporting period of the RI, and $N_{OFFSET,BI}$ is an offset of an initial moment at which the BI and the RI or the BI is reported:

$$(10 \times n_f + \lfloor n_s/2 \rfloor - N_{OFFSET,CQI} - N_{OFFSET,RI} - N_{OFFSET,BI}) \bmod (N_{pd} \cdot M_{RI} \cdot M_{BI}) = 0$$

For details, refer to a correspondence shown in Table 12.

TABLE 12

| $I_{BI}$ | Value of $M_{BI}$ | Value of $N_{OFFSET,BI}$ |
|---|---|---|
| $0 \leq I_{BI} \leq 5120$ | 1 | $-I_{BI}$ |
| $5121 \leq I_{BI} \leq 10241$ | 2 | $-(I_{BI}-5121)$ |
| $10242 \leq I_{BI} \leq 15362$ | 4 | $-(I_{BI}-10242)$ |
| $15363 \leq I_{BI} \leq 20483$ | 8 | $-(I_{BI}-15363)$ |
| $20484 \leq I_{BI} \leq 25604$ | 16 | $-(I_{BI}-20484)$ |
| $25605 \leq I_{BI} \leq 30725$ | 32 | $-(I_{BI}-25605)$ |
| $30726 \leq I_{BI} \leq 32768$ | Reserved | |

To ensure that a value of an $I_{BI}$ field is the same as that of an $I_{RI}$ field, a value of $N_{pd}$ or $M_{RI}$ may be limited. For example, a maximum value of $N_{pd}$ is limited to 40, or a maximum value of $M_{RI}$ is limited to 8, or $M_{BI}$ is an integer multiple of $M_{RI}$.

Embodiment 2

Figure 8:
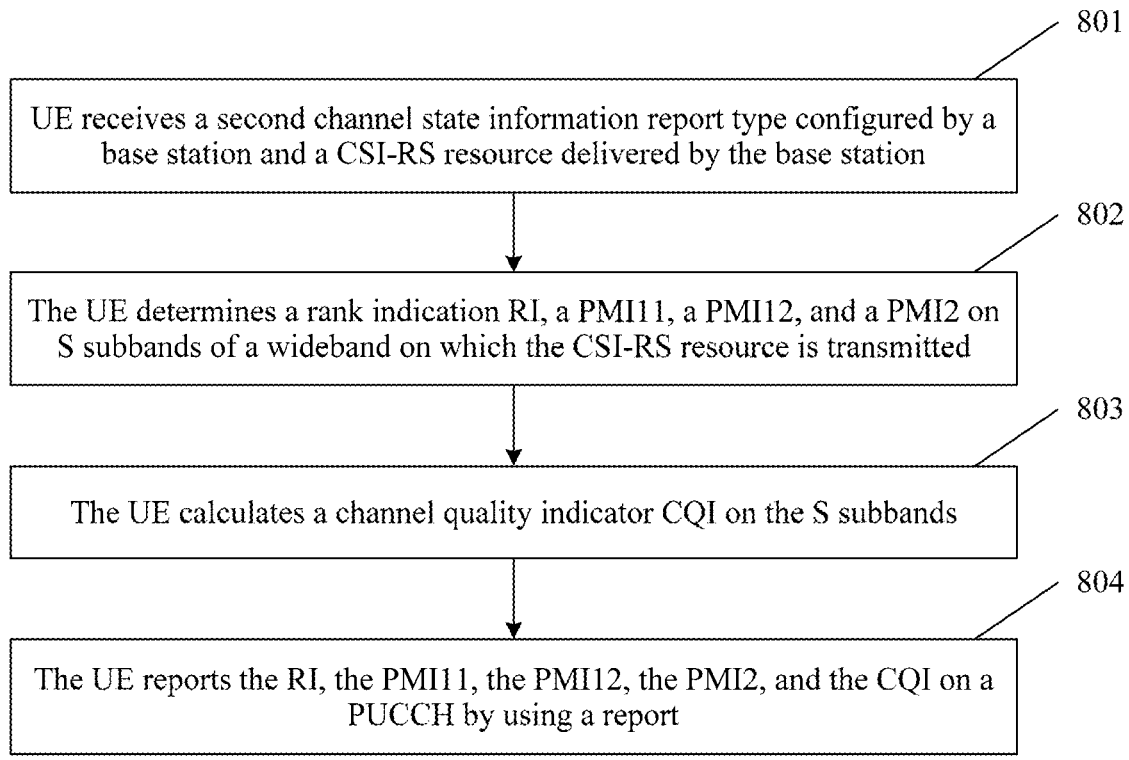
FIG. 8 is an embodiment diagram of a measurement and feedback method according to an embodiment of the present invention.

For a non-precoded CSI-RS mechanism, an embodiment of the present invention provides a method for measuring and feeding back channel state information. Referring to FIG. 8, FIG. 8 is an embodiment diagram of a measurement and feedback method according to an embodiment of the present invention. The method may include the following steps.

801. UE receives a second channel state information report type configured by a base station and a CSI-RS resource delivered by the base station.

It should be noted that the second channel state information report type in this embodiment of the present invention is a type of channel state information fed back by the UE in the non-precoded CSI-RS mechanism, that is, a channel state information class A.

It may be understood that the UE first learns, according to the second channel state information report type configured by the base station, a type of channel state information that needs to be fed back. The feedback herein is performed according to the non-precoded CSI-RS mechanism. In the mechanism, the UE receives the CSI-RS resource delivered by the base station, so as to subsequently determine an RI and a PMI.

802. The UE determines a rank indication RI, a PMI11, a PMI12, and a PMI2 on S subbands of a wideband on which the CSI-RS resource is transmitted.

S is an integer greater than or equal to 1. The PMI11 and the PMI12 are separately a one-dimension PMI of a first PMI in a double codebook structure, and the PMI2 is a second PMI in the double codebook structure.

It may be understood that, in the non-precoded CSI-RS mechanism, because a codebook is a new 2D codebook, PMIs include the first PMI and the second PMI in the double codebook structure. Because the first PMI is two-dimensional, the first PMI has two components PMI11 and PMI12 of two dimensions. When determining the PMI, the UE needs to determine three PMIs: the PMI11, the PMI12, and the PMI2. For a final matrix indicated by the PMI, precoding matrices separately indicated by the PMI11 and the PMI12 first need to be combined to form a precoding matrix indicated by a PMI1, and then the precoding matrix indicated by the PMI1 is combined with a precoding matrix indicated by the PMI2, to form the final matrix indicated by the PMI.

803. The UE calculates a channel quality indicator CQI on the S subbands.

It may be understood that, after determining the RI, the PMI11, the PMI12, and the PMI2, the UE calculates the CQI on the S subbands. A value of the CQI reflects quality of a selected channel.

804. The UE reports the RI, the PMI11, the PMI12, the PMI2, and the CQI on a PUCCH by using a report.

After determining the RI, the PMI11, the PMI12, the PMI2, and the CQI, the UE reports the RI, the PMI11, the PMI12, the PMI2, and the CQI on the PUCCH by using the report.

It should be noted that there is mainly a PUCCH feedback mode 1-1 and a PUCCH feedback mode 2-1 in the mechanism.

Optionally, a PUCCH feedback mode is PUCCH 1-1 or PUCCH 2-1. A format of the report used for reporting the PMI11 and/or the PMI12 includes a format 1, a format 2, and a format 3. A report in the format 1 is separate reporting of the PMI11 or the PMI12. A report in the format 2 is joint reporting of the PMI11 and the RI, or a report in the format 2 is joint reporting of the PMI12 and the RI. A report in the format 3 is joint reporting of the PMI11, a wideband PMI2, and a wideband CQI, or a report in the format 3 is joint reporting of the PMI12, a wideband PMI2, and a wideband CQI.

It may be learned that the PUCCH feedback mode 1-1 and the PUCCH feedback mode 2-1 each may have three reporting formats. That is, the report in the format 1 is separate reporting of the PMI11 or the PMI12; the report in the format 2 is joint reporting of the PMI11 and the RI, or the report in the format 2 is joint reporting of the PMI12 and the RI; and the report in the format 3 is joint reporting of the PMI11, the wideband PMI2, and the wideband CQI, or the report in the format 3 is joint reporting of the PMI12, the wideband PMI2, and the wideband CQI. The report in the format 2 and the report in the format 3 each include two reporting formats, and the two reporting formats are corresponding to two different feedback submodes of the PUCCH feedback mode 1-1 and the PUCCH feedback mode 2-1, that is, a feedback submode 1 and a feedback submode 2.

For example, for the PUCCH feedback mode 1-1, two reporting manners of the report in the format 2 and two reporting manners of the report in the format 3 are used. Optionally, different feedback submodes of the PUCCH feedback mode are set according to different PMIs jointly reported with the RI in the report in the format 2, where the PMI jointly reported with the RI is the PMI11 or the PMI12. Further optionally, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

For specific feedback processes of the two feedback submodes, refer to Table 13.

TABLE 13

| | | | | |
|---|---|---|---|---|
| Feedback submode 1 | RI + PMI12 | CQI + PMI11 + PMI2 | . . . | CQI + PMI11 + PMI2 |
| Feedback submode 2 | RI + PMI11 | CQI + PMI12 + PMI2 | . . . | CQI + PMI12 + PMI2 |

It may be learned that, in the feedback submode 1, the RI and the PMI12 are first jointly reported by using the report in the format 2. Then, in a report for reporting of the CQI, the PMI11, the wideband PMI2, and the wideband CQI are jointly reported. Then the PMI11, the wideband PMI2, and the wideband CQI may be further jointly reported, until report reporting in one complete period is completed. In the feedback submode 2, the RI and the PMI11 are first jointly reported by using the report in the format 2. Then, in a report for reporting of the CQI, the PMI12, the wideband PMI2, and the wideband CQI are jointly reported. Then the PMI12, the wideband PMI2, and the wideband CQI may be further jointly reported, until report reporting in one complete period is completed.

Optionally, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

For another example, in two different submodes of the PUCCH feedback mode 2-1 that are corresponding to the sequence 1, for specific report reporting cases, refer to Table 14.

TABLE 14

| | | | | | |
|---|---|---|---|---|---|
| Sequence 1 (submode 2) | RI + W12, PTI = 1 | W11 + W2wb + CQIwb | W2sb1 + CQIsb1 | W2sb2 + CQIsb2 | W2sb3 + CQIsb3 |
| Sequence 1 (submode 1) | RI + W11, PTI = 1 | W12 + W2wb + CQIwb | W2sb1 + CQIsb1 | W2sb2 + CQIsb2 | W2sb3 + CQIsb3 |

In the table, W12 indicates reporting of the PMI12, W11 indicates reporting of the PMI11, W2 indicates reporting of the PMI2, sb indicates subband reporting, for example, W2sb actually indicates reporting of a subband PMI2, and wb indicates wideband reporting, for example, CQIwb indicates reporting of the wideband CQI.

It may be understood that a report for jointly reporting the PMI11, the PMI2, and the wideband CQI is included in the feedback submode 2 of the sequence 1, and a report for jointly reporting the PMI12, the PMI2, and the wideband CQI is included in the feedback submode 1 of the sequence 1.

For another example, in two different submodes of the PUCCH feedback mode 2-1 that are corresponding to the sequence 0, for specific report reporting cases, refer to Table 15.

TABLE 15

| | | | | | |
|---|---|---|---|---|---|
| Sequence 0 (submode 2) | RI + W12, PTI = 0 | W11 | W2wb + CQIwb | W2wb + CQIwb | W2wb + CQIwb |
| Sequence 0 (submode 1) | RI + W11, PTI = 0 | W12 | W2wb + CQIwb | W2wb + CQIwb | W2wb + CQIwb |

In the table, W12 indicates reporting of the PMI12, W11 indicates reporting of the PMI11, W2 indicates reporting of the PMI2, and wb indicates wideband reporting, for example, CQIwb indicates reporting of the wideband CQI.

It may be understood that a report for separately reporting the PMI12 is included in the feedback submode 1 of the sequence 0, and a report for separately reporting the PMI11 is included in the feedback submode 1 of the sequence 0.

Embodiment 3

Figure 9:
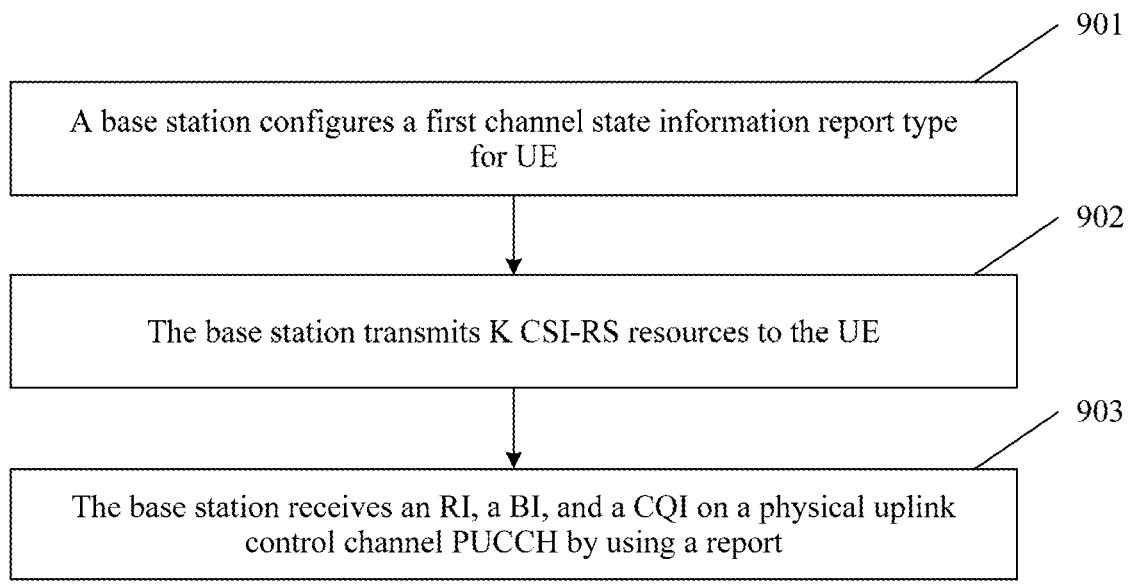
FIG. 9 is an embodiment diagram of a configuration and receiving method according to an embodiment of the present invention.

The method for measuring and feeding back channel state information on the basis of a user equipment side in the embodiment of the present invention is described above. A method for configuring and receiving a channel state information report on the basis of a base station side in an embodiment of the present invention is described below. This embodiment is corresponding to the method executed by the UE in Embodiment 1 shown in FIG. 3. Referring to FIG. 9, FIG. 9 is an embodiment diagram of a configuration and receiving method according to an embodiment of the present invention. As shown in FIG. 9, the method may include the following steps.

901. A base station configures a first channel state information report type for UE.

It may be understood that, to successfully identify a report finally reported by the UE, the base station may preconfigure the first channel state information report type for the UE. In this embodiment, the first channel state information report type is a type of channel state information fed back by the UE in a beamformed CSI-RS mechanism.

902. The base station transmits K CSI-RS resources to the UE.

K is an integer greater than or equal to 1.

In this case, the UE can report an optimal beam according to a plurality of CSI-RS resources, so that the base station can subsequently determine a channel on which the CSI-RS resources are allocated.

903. The base station receives an RI, a BI, and a CQI on a physical uplink control channel PUCCH.

It may be understood that, after measuring channel state information, the UE reports the RI, the BI, and the CQI to the base station by using a report. The base station may send a CSI-RS resource or other information next time according to these measured values.

Optionally, in the report, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

It may be understood that division of the three reporting formats is similar to that of the three formats in the reporting process in Embodiment 1 shown in FIG. 3. Details are not described herein again.

Optionally, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2.

It should be noted that a case in which the reporting period in the format 2 is an integer multiple of the reporting period of the report in the format 2 in the PUCCH feedback mode 1-1 or the PUCCH feedback mode 2-1 is similar to that in a case in which both the report in the format 2 and the report in the format 3 are included in Embodiment 1 shown in FIG. 3. Details are not described herein again.

Optionally, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

The PUCCH feedback mode is the PUCCH 1-1, there are two or four antenna ports, and the report in the format 3 is reporting of the wideband CQI and the wideband PMI.

It should be noted that a case in which there are two or four antenna ports in the PUCCH feedback mode 1-1 is similar to the reporting process shown in FIG. 4. Details are not described herein again.

The PUCCH feedback mode is the PUCCH 1-1, there are four or eight antenna ports, and the report in the format 3 is joint reporting of the wideband CQI, the wideband PMI1, and the wideband PMI2.

It should be noted that a case in which there are four or eight antenna ports in the PUCCH feedback mode 1-1 is similar to the reporting process shown in FIG. 5. Details are not described herein again.

Optionally, a PUCCH feedback mode is PUCCH 2-1, there are two or four antenna ports, a format of the report includes a format 1, a format 2, and a format 3, a report in the format 1 is joint reporting of the BI and the RI, a report in the format 2 is reporting of a wideband PMI and a wideband CQI, a report in the format 3 is reporting of the RI, and a reporting period of the report in the format 1 is an integer multiple of a reporting period of the report in the format 2.

It should be noted that a case in which there are two or four antenna ports in the PUCCH feedback mode 2-1 is similar to the reporting process shown in FIG. 6. Details are not described herein again.

Optionally, there are four or eight antenna ports, a format of the report includes a format 1, a format 2, a format 3, and a format 4, a report in the format 1 is joint reporting of the BI, the RI, and a PTI, a report in the format 2 is reporting of the RI and the PTI, a report in the format 3 is reporting of a wideband PMI1, or a report in the format 3 is reporting of a wideband CQI and a wideband PMI2, a report in the format 4 is reporting of the wideband CQI and the wideband PMI2, or a report in the format 4 is reporting of a subband CQI and a subband PMI2, and a reporting period of the report in the format 1 is an integer multiple of a reporting period of the report in the format 2.

It should be noted that a case in which there are four or eight antenna ports in the PUCCH feedback mode 2-1 is similar to the reporting process shown in FIG. 7. Details are not described herein again.

Embodiment 4

Figure 10:
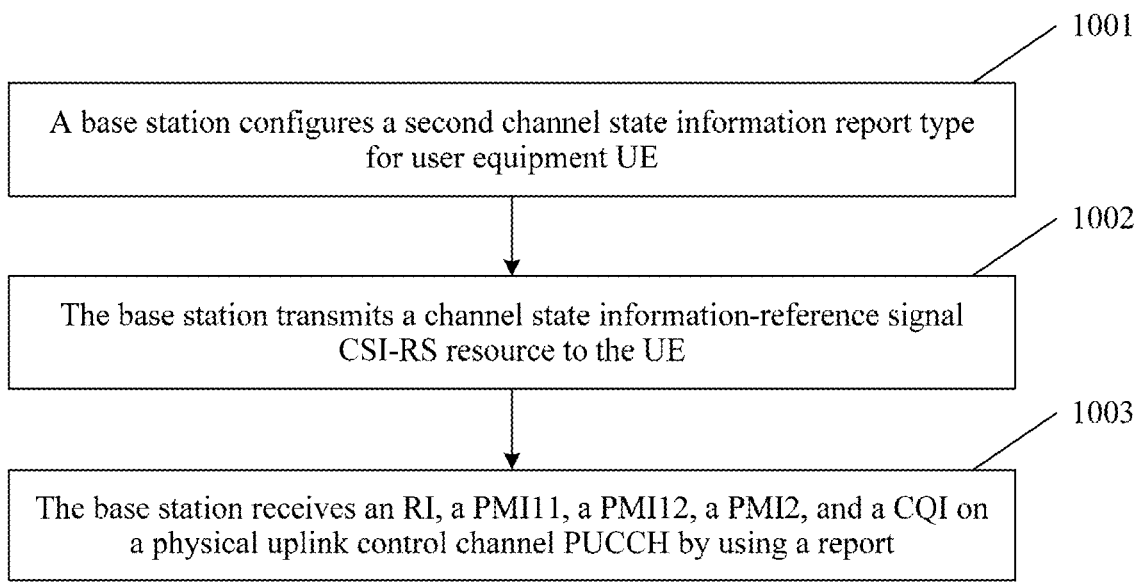
FIG. 10 is an embodiment diagram of a configuration and receiving method according to an embodiment of the present invention.

A process performed by the base station corresponding to the user equipment in Embodiment 1 shown in FIG. 3 is described above. A process performed by a base station corresponding to the user equipment in Embodiment 2 shown in FIG. 9 is described below. Referring to FIG. 10, FIG. 10 is an embodiment diagram of a configuration and receiving method according to an embodiment of the present invention. As shown in FIG. 10, the method may include the following steps.

1001. The base station configures a second channel state information report type for user equipment UE.

It may be understood that, to successfully identify a report finally reported by the UE, the base station may preconfigure the second channel state information report type for the UE. In this embodiment, the second channel state information report type is a type of channel state information fed back by the UE in a non-precoded CSI-RS mechanism.

1002. The base station transmits a channel state information-reference signal CSI-RS resource to the UE.

In this case, the UE can determine channel state information according to the CSI-RS resource, so that the base station can subsequently determine a channel on which the CSI-RS resource is allocated.

1003. The base station receives an RI, a PMI11, a PMI12, a PMI2, and a CQI on a physical uplink control channel PUCCH.

It may be understood that, after measuring the channel state information, the UE reports the PMI11, the PMI12, the PMI2, and the CQI to the base station by using a report. The base station may send a CSI-RS resource or other information next time according to these measured values.

It may be understood that, in the non-precoded CSI-RS mechanism, because a codebook is a new 2D codebook, PMIs include a first PMI and a second PMI in a double codebook structure. Because the first PMI is two-dimensional, the first PMI has two components PMI11 and PMI12 of two dimensions. When determining the PMI, the UE needs to determine three PMIs: the PMI11, the PMI12, and the PMI2. For a final matrix indicated by the PMI, precoding matrices separately indicated by the PMI11 and the PMI12 first need to be combined to form a precoding matrix indicated by a PMI1, and then the precoding matrix indicated by the PMI is combined with a precoding matrix indicated by the PMI2, to form the final matrix indicated by the PMI.

Optionally, a PUCCH feedback mode is PUCCH 1-1 or PUCCH 2-1. A format of the report used for reporting the PMI11 and/or the PMI12 includes a format 1, a format 2, and a format 3. A report in the format 1 is separate reporting of the PMI11 or the PMI12. A report in the format 2 is joint reporting of the PMI11 and the RI, or a report in the format 2 is joint reporting of the PMI12 and the RI. A report in the format 3 is joint reporting of the PMI11, a wideband PMI2, and a wideband CQI, or a report in the format 3 is joint reporting of the PMI12, a wideband PMI2, and a wideband CQI.

It should be noted that the report in the format 2 and the report in the format 3 each include two reporting formats, and the two reporting formats are corresponding to two different feedback submodes of the PUCCH feedback mode 1-1 and the PUCCH feedback mode 2-1, that is, a feedback submode 1 and a feedback submode 2.

Optionally, the method further includes: setting different feedback submodes of the PUCCH feedback mode according to different PMIs jointly reported with the RI in the report in the format 2, where the PMI jointly reported with the RI is the PMI11 or the PMI12.

Optionally, the PUCCH 1-1 and the PUCCH 2-1 each include a feedback submode 1 and a feedback submode 2, the report in the format 2 in the feedback submode 1 is joint reporting of the RI and the PMI11, and the report in the format 2 in the feedback submode 2 is joint reporting of the RI and the PMI12.

A specific feedback process in the foregoing optional manner is similar to the feedback process shown in Table 11 in Embodiment 2 shown in FIG. 8. Details are not described herein again.

Optionally, the report in the format 3 in a feedback submode 1 of the PUCCH feedback mode 1-1 and the report in the format 3 in a feedback submode 1 that is of the PUCCH feedback mode 2-1 and that is corresponding to a sequence 1 each are joint reporting of the PMI12, the PMI2, and the wideband CQI, the report in the format 3 in a feedback submode 2 of the PUCCH feedback mode 1-1 and the report in the format 3 in a feedback submode 2 that is of the PUCCH feedback mode 2-1 and that is corresponding to the sequence 1 each are joint reporting of the PMI11, the PMI2, and the wideband CQI, the report in the format 1 in a feedback submode 1 that is of the PUCCH feedback mode 2-1 and that is corresponding to a sequence 0 is separate reporting of the PMI12, and the report in the format 1 in a feedback submode 2 that is of the PUCCH feedback mode 2-1 and that is corresponding to the sequence 0 is separate reporting of the PMI11.

It should be noted that specific feedback processes of the sequence 1 and the sequence 0 are similar to the feedback processes in Table 12 and Table 13 in the embodiment shown in FIG. 8. Details are not described herein again.

Embodiment 5

Figure 11:
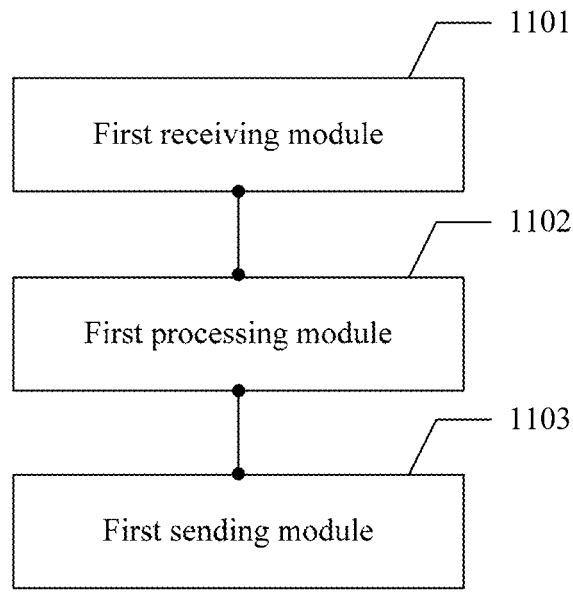
FIG. 11 is an embodiment diagram of user equipment according to an embodiment of the present invention.

The measurement and feedback method in the embodiment of the present invention is described above. User equipment in an embodiment of the present invention is described below. Referring to FIG. 11, FIG. 11 is an embodiment diagram of user equipment according to an embodiment of the present invention. As shown in FIG. 11, the user equipment may include a first receiving module 1101, a first processing module 1102, and a first sending module 1103.

The first receiving module 1101 is configured to receive a first channel state information report type configured by a base station and K channel state information-reference signal CSI-RS resources delivered by the base station, where K is an integer greater than or equal to 1.

It should be noted that the first channel state information report type in this embodiment of the present invention is a type of channel state information fed back by the UE in a beamformed CSI-RS mechanism.

It may be understood that the first receiving module 1101 first learns, according to the first channel state information report type configured by the base station, a type of channel state information that needs to be fed back. The feedback herein is performed according to the beamformed CSI-RS mechanism. In the mechanism, the UE receives the K CSI-RS resources delivered by the base station, so that the UE can report an optimal beam according to the CSI-RS resources, that is, determine an optimal BI.

The first processing module 1102 is configured to determine, according to the channel state information report type, a rank indication RI and/or a beamforming indication BI on S subbands of a wideband on which the K CSI-RS resources are transmitted, where S is an integer greater than or equal to 1.

S is an integer greater than or equal to 1.

It should be noted that the first processing module 1102 may determine three types of indication information according to the K CSI-RS resources before a reporting moment. The three types of indication information are an RI, a BI, and an RI and a BI. Specifically, the indication information may be different according to the RI, the BI, or the RI and the BI that need to be reported at a subsequent reporting moment.

The first processing module 1102 is further configured to calculate a channel quality indicator CQI on the S subbands.

It may be understood that, after the first processing module 1102 determines the RI and/or the BI, the UE calculates the CQI on the S subbands. A value of the CQI reflects quality of a selected channel.

The first sending module 1103 is configured to report the RI, the BI, and the CQI on a physical uplink control channel PUCCH by using a report.

After the RI, the BI, and the CQI are determined, the first sending module 1103 reports the RI, the BI, and the CQI on the PUCCH by using the report.

The first receiving module 1101 may implement step 301 in Embodiment 1 shown in FIG. 3. The first processing module 1102 may implement step 302 and step 303 in Embodiment 1 shown in FIG. 3. The first sending module 1103 may implement step 304 in Embodiment 1 shown in FIG. 3.

Optionally, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

Optionally, a PUCCH feedback mode is PUCCH 1-1 or PUCCH 2-1, the PUCCH 1-1 and the PUCCH 2-1 each include a feedback submode 1 and a feedback submode 2, the BI is reported in the feedback submode 1 and the feedback submode by using reports in different formats, and the BI is reported in the feedback submode 1 by using the report in the format 1 or is reported in the feedback submode 2 by using the report in the format 3, or the BI is reported in the feedback submode 1 by using the report in the format 3 or is reported in the feedback submode 2 by using the report in the format 1.

It may be understood that design of the feedback submode is similar to that in related content in Embodiment 1 shown in FIG. 3. For a specific reporting process, refer to a process of implementing step 304 in Embodiment 1 shown in FIG. 3. Details are not described herein again.

Optionally, a PUCCH feedback mode is PUCCH 1-1 or PUCCH 2-1, the PUCCH 1-1 and the PUCCH 2-1 each include reporting of the report in the format 2 and reporting of the report in the format 3, and the reporting period of the report in the format 3 is an integer multiple of the reporting period of the report in the format 2. A PUCCH feedback mode is PUCCH 1-1 or PUCCH 2-1, the report in the format 2 further includes a PMI, the PMI indicates a precoding matrix in a preset codebook, and the report that is in the format 2 and that includes the PMI is joint reporting of the RI and the PMI. The reporting period of the BI is M times the reporting period of the RI, and M is configured differently for different quantities of antenna ports, where M is an integer greater than or equal to 1. For a specific feedback process, refer to the feedback process shown in Table 5 and Table 6 in the embodiment shown in FIG. 3. A case in which the PMI is reported in the PUCCH feedback mode 2-1 is not described herein again.

Optionally, the first processing module is further configured to:

determine a precoding type indicator PTI on the S subbands of the wideband on which the K CSI-RS resources are transmitted, where the PTI indicates a precoding type.

The report in the format 1 further includes a PMI or the PTI, a report that is in the format 1 and that includes the PMI is joint reporting of the BI and the PMI, a report that is in the format 1 and that includes the PTI is joint reporting of the BI and the PTI, the report in the format 3 further includes the PTI, and the report that is in the format 3 and that includes the PTI is joint reporting of the BI, the RI, and the PTI. Specifically, the report in the format 1 further includes quantities of feedback bits of the PMI or the PTI in various PUCCH feedback modes. Refer to content shown in Table 7 in the embodiment shown in FIG. 3. Details are not described herein again.

Optionally, a PUCCH reporting format includes a format 3a, a format 6a, and a format 7, and a quantity of feedback bits of the report is determined according to at least one of a quantity of CSI-RS resources or a quantity of spatial multiplexing layers. For details, refer to content shown in Table 8 in the embodiment shown in FIG. 3, including quantities of feedback bits in the format 3a, the format 6a, and the format 7. Details are not described herein again.

Optionally, the PMI in the report that is in the format 1 and that includes the PMI is first precoding $i_1$ in a double codebook structure or precoding i in a single codebook structure, and the first processing module is further configured to:

perform downsampling on the precoding i or the first precoding $i_1$, where the report that is in the format 1 and that includes the PMI is joint reporting of the BI and the precoding i or the BI and the first precoding $i_1$.

It may be understood that the PMI may be the first precoding $i_1$ in the double codebook structure or the precoding i in the single codebook structure. Downsampling is performed on the precoding i or the first precoding $i_1$. The downsampling indicates that sampling is performed on a sample sequence once every several samples, to obtain a new sequence. The new sequence is obtained after downsampling is performed on the original sequence. Downsampling processing may be performed on the sample i or $i_1$ herein. Then the sample i or $i_1$ may be included in the report that is in the format 1 and that includes the PMI. That is, the BI and i are jointly reported, or the BI and $i_1$ are jointly reported. Specifically, for joint encoding performed after downsampling, refer to content in Table 11 in Embodiment 1 shown in FIG. 3. Details are not described herein again.

Optionally, a PUCCH feedback mode is PUCCH 1-1, a format of the report includes a format 1, a format 2, and a format 3, a report in the format 1 is joint reporting of the BI and the RI, a report in the format 2 is reporting of the RI, a report in the format 3 is reporting of a wideband CQI and a wideband PMI or joint reporting of a wideband CQI, a wideband PMI1, and a wideband PMI2, a reporting period of the report in the format 1 is an integer multiple of a reporting period of the report in the format 2, the reporting period of the report in the format 2 is greater than or equal to a reporting period of the report in the format 3, and the PMI, the PMI1, and the PMI2 all indicate a precoding matrix in a preset codebook.

It should be noted that there may be specifically reporting for two or four ports and reporting for four or eight ports. The reporting for the two or four ports is similar to the reporting process shown in FIG. 4. The reporting for the four or eight ports is similar to the reporting process shown in FIG. 5. Details are not described herein again.

In addition, for a PUCCH feedback mode 2-1, there are also reporting for two or four ports and reporting for four or eight ports. The reporting for the two or four ports is similar to the reporting process shown in FIG. 6. The reporting for the four or eight ports is similar to the reporting process shown in FIG. 7. Details are not described herein again.

In addition, the first processing module is further configured to determine a value of the RI and/or a value of the BI according to the quantity of spatial multiplexing layers and/or the quantity of CS-RS resources. For example, when the quantity of CSI-RS resources is 1, the value of the RI and/or the value of the BI are/is corresponding to a quantity of ports of the CSI-RS resources; or when the quantity of CSI-RS resources is greater than 1, the value of the RI and/or the value of the BI are/is corresponding to the quantity of CSI-RS resources, the quantity of spatial multiplexing layers, and/or a quantity of ports of the CSI-RS resources. Alternatively, when the PTI exists, a value of the RI, a value of the BI, and/or a value of the PTI are/is determined according to the quantity of spatial multiplexing layers and/or the quantity of CS-RS resources. For a specific determining relationship, refer to descriptions in Table 2 to Table 4 in the embodiment shown in FIG. 3. Details are not described herein again.

Embodiment 6

Figure 12:
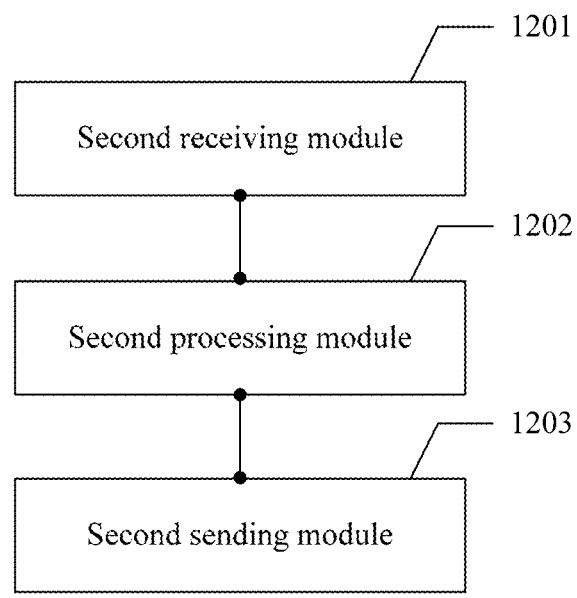
FIG. 12 is an embodiment diagram of user equipment according to an embodiment of the present invention.

The measurement and feedback method in the embodiment of the present invention is described above. User equipment in an embodiment of the present invention is described below. Referring to FIG. 12, FIG. 12 is an embodiment diagram of user equipment according to an embodiment of the present invention. As shown in FIG. 12, the user equipment may include a second receiving module 1201, a second processing module 1202, and a second sending module 1203.

The second receiving module 1201 is configured to receive a second channel state information report type configured by a base station and a channel state information-reference signal CSI-RS resource delivered by the base station.

It should be noted that the second channel state information report type in this embodiment of the present invention is a type of channel state information fed back by the UE in a non-precoded CSI-RS mechanism.

It may be understood that the second receiving module 1201 first learns, according to the received first channel state information report type configured by the base station, a type of channel state information that needs to be fed back. The feedback herein is performed according to the non-precoded CSI-RS mechanism. In the mechanism, the second receiving module 1201 receives the CSI-RS resource delivered by the base station, so as to subsequently determine an RI and a PMI.

The second processing module 1202 is configured to determine a rank indication RI and precoding matrix indicators: a PMI11, a PMI12, and a PMI2 on S subbands of a wideband on which the CSI-RS resource is transmitted, where S is an integer greater than or equal to 1, the PMI11 and the PMI12 are separately a one-dimension PMI of a first PMI in a double codebook structure, and the PMI2 is a second PMI in the double codebook structure.

It may be understood that, in the non-precoded CSI-RS mechanism, because a codebook is a new 2D codebook, PMIs include the first PMI and the second PMI in the double codebook structure. Because the first PMI is two-dimensional, the first PMI has two components PMI11 and PMI12 of two dimensions. When determining the PMI, the UE needs to determine three PMIs: the PMI11, the PMI12, and the PMI2. For a final matrix indicated by the PMI, precoding matrices separately indicated by the PMI11 and the PMI12 first need to be combined to form a precoding matrix indicated by a PMI1, and then the precoding matrix indicated by the PMI is combined with a precoding matrix indicated by the PMI2, to form the final matrix indicated by the PMI.

The second processing module 1202 is further configured to calculate a channel quality indicator CQI on the S subbands.

It may be understood that, after determining the RI, the PMI11, the PMI12, and the PMI2, the second processing module 1202 calculates the CQI on the S subbands. A value of the CQI reflects quality of a selected channel.

The second sending module 1203 is configured to report the RI, the PMI11, the PMI12, the PMI2, and the CQI on a physical uplink control channel PUCCH by using a report.

The second receiving module 1201 may implement step 801 in Embodiment 2 shown in FIG. 8. The second processing module 1202 may implement step 802 and step 803 in Embodiment 2 shown in FIG. 8. The second sending module 1203 may implement step 804 in Embodiment 2 shown in FIG. 8.

It should be noted that there is mainly a PUCCH feedback mode 1-1 and a PUCCH feedback mode 2-1 in the mechanism.

The PUCCH feedback mode 1-1 and the PUCCH feedback mode 2-1 each include three reporting formats. Specific format content is the same as content in Embodiment 2 shown in FIG. 8.

Specifically, the PUCCH feedback mode 1-1 may include two feedback submodes. For details, refer to the feedback process shown in Table 11 in Embodiment 2 shown in FIG. 8.

In addition, the PUCCH feedback mode 2-1 may include two sequences, that is, a sequence 0 and a sequence 1. The sequence 0 and the sequence 1 each include two feedback submodes. For details, refer to the feedback processes shown in Table 12 and Table 13 in Embodiment 2 shown in FIG. 8. Table 12 is specific to the sequence 1, and Table 13 is specific to the sequence 0. Details are not described herein again.

Embodiment 7

Figure 13:
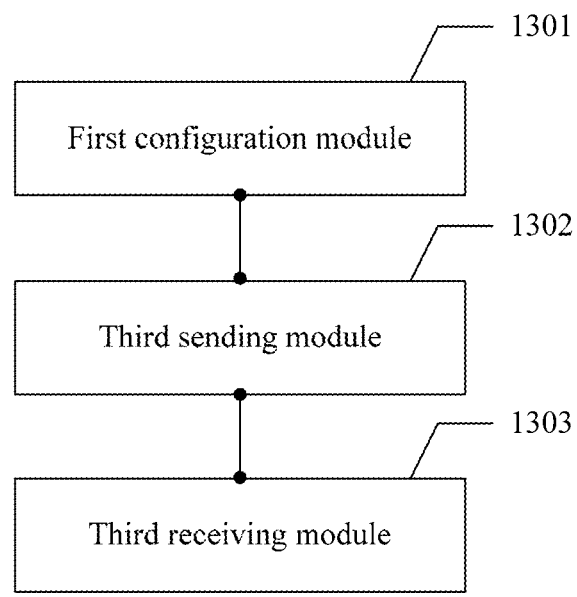
FIG. 13 is an embodiment diagram of a base station according to an embodiment of the present invention.

The user equipment in the embodiment of the present invention is described above. A base station in an embodiment of the present invention is described below. Referring to FIG. 13, FIG. 13 is an embodiment diagram of a base station according to an embodiment of the present invention. The base station may include a first configuration module 1301, a third sending module 1302, and a third receiving module 1303.

The first configuration module 1301 is configured to configure a first channel state information report type for user equipment UE.

It may be understood that, in order that the base station can successfully identify a report finally reported by the UE, the first configuration module 1301 may preconfigure the first channel state information report type for the UE. In this embodiment, the first channel state information report type is a type of channel state information fed back by the UE in a beamformed CSI-RS mechanism.

The third sending module 1302 is configured to transmit K CSI-RS resources to the UE, where K is an integer greater than or equal to 1.

In order that the UE can report an optimal beam according to a plurality of CSI-RS resources, and therefore the base station can subsequently determine a channel on which the CSI-RS resources are allocated, the third sending module 1302 transmits the K channel state information-reference signal CSI-RS resources to the UE.

The third receiving module 1303 is configured to receive an RI, a BI, and a CQI on a physical uplink control channel PUCCH.

The first configuration module 1301 may implement step 901 in Embodiment 3 shown in FIG. 9. The third sending module 1302 may implement step 902 in Embodiment 3 shown in FIG. 9. The third receiving module 1303 may implement step 903 in Embodiment 3 shown in FIG. 9.

It may be understood that, after measuring channel state information, the UE reports the RI, the BI, and the CQI to the base station by using a report. After the third receiving module 1303 receives the report, the base station may send a CSI-RS resource or other information next time according to these measured values.

Optionally, in the report, a reporting period of the BI is greater than or equal to a reporting period of the RI, a format of the report includes a format 1, a format 2, and a format 3, a report in the format 1 is separate reporting of the BI, a report in the format 2 is reporting of the RI, a report in the format 3 is joint reporting of the BI and the RI, and a reporting period of the report in the format 1 and a reporting period of the report in the format 3 each are an integer multiple of a reporting period of the report in the format 2.

It may be understood that division of the three reporting formats is similar to that of the three formats in the reporting process in Embodiment 1 shown in FIG. 3. Details are not described herein again.

In addition, for a reporting process in a PUCCH feedback mode 1-1 or a PUCCH feedback mode 2-1, for example, a case in which there are two or four antenna ports in the PUCCH feedback mode 1-1 is similar to the reporting process shown in FIG. 4. For another example, a case in which there are four or eight antenna ports in the PUCCH feedback mode 1-1 is similar to the reporting process shown in FIG. 5. For another example, a case in which there are two or four antenna ports in the PUCCH feedback mode 2-1 is similar to the reporting process shown in FIG. 6. For another example, a case in which there are four or eight antenna ports in the PUCCH feedback mode 2-1 is similar to the reporting process shown in FIG. 7. Details are not described herein again.

Reporting processes in other PUCCH feedback modes are similar to reporting processes in related PUCCH feedback modes in the embodiment shown in FIG. 9. Details are not described herein again.

Embodiment 8

Figure 14:
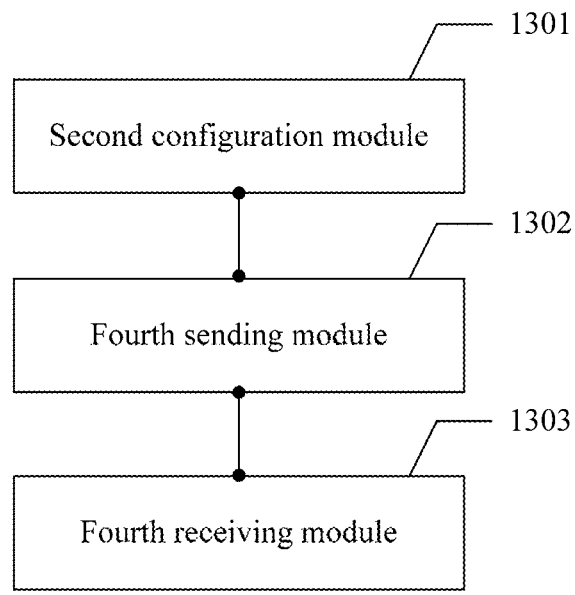
FIG. 14 is an embodiment diagram of a base station according to an embodiment of the present invention.

The base station in the embodiment of the present invention is described above. Another base station in an embodiment of the present invention is described below. Referring to FIG. 14, FIG. 14 is an embodiment diagram of a base station according to an embodiment of the present invention. The base station may include a second configuration module 1401, a fourth sending module 1402, and a fourth receiving module 1403.

The second configuration module 1401 is configured to configure a second channel state information report type for user equipment UE.

It may be understood that, in order that the base station can successfully identify a report finally reported by the UE, the second configuration module 1401 may preconfigure the second channel state information report type for the UE. In this embodiment, the second channel state information report type is a type of channel state information fed back by the UE in a non-precoded CSI-RS mechanism.

The fourth sending module 1402 is configured to transmit a channel state information-reference signal CSI-RS resource to the UE.

In order that the UE can determine channel state information according to the CSI-RS resource, and therefore the base station can subsequently determine a channel on which the CSI-RS resource is allocated, the fourth sending module 1402 sends the CSI-RS resource to the UE.

The fourth receiving module 1403 is configured to receive an RI, a PMI11, a PMI12, a PMI2, and a CQI on a physical uplink control channel PUCCH.

The second configuration module 1401 may implement step 1001 in Embodiment 4 shown in FIG. 10. The fourth sending module 1402 may implement step 1002 in Embodiment 4 shown in FIG. 10. The fourth receiving module 1403 may implement step 1003 in Embodiment 4 shown in FIG. 10.

It may be understood that, after measuring the channel state information, the UE reports the PMI11, the PMI12, the PMI2, and the CQI to the base station by using a report. The base station may send a CSI-RS resource or other information next time according to these measured values.

It may be understood that, in the non-precoded CSI-RS mechanism, because a codebook is a new 2D codebook, PMIs include a first PMI and a second PMI in a double codebook structure. Because the first PMI is two-dimensional, the first PMI has two components PMI11 and PMI12 of two dimensions. When determining the PMI, the UE needs to determine three PMIs: the PMI11, the PMI12, and the PMI2. For a final matrix indicated by the PMI, precoding matrices separately indicated by the PMI11 and the PMI12 first need to be combined to form a precoding matrix indicated by a PMI1, and then the precoding matrix indicated by the PMI is combined with a precoding matrix indicated by the PMI2, to form the final matrix indicated by the PMI.

It may be understood that a feedback mode of the report may be PUCCH 1-1 or PUCCH 2-1.

A feedback process in the PUCCH feedback mode 1-1 is similar to the feedback process shown in Table 11 in Embodiment 2 shown in FIG. 8. Details are not described herein again. Specific feedback processes of a sequence 1 and a sequence 0 in the PUCCH feedback mode 2-1 are similar to the feedback processes in Table 12 and Table 13 in the embodiment shown in FIG. 8. Details are not described herein again.

Figure 15:
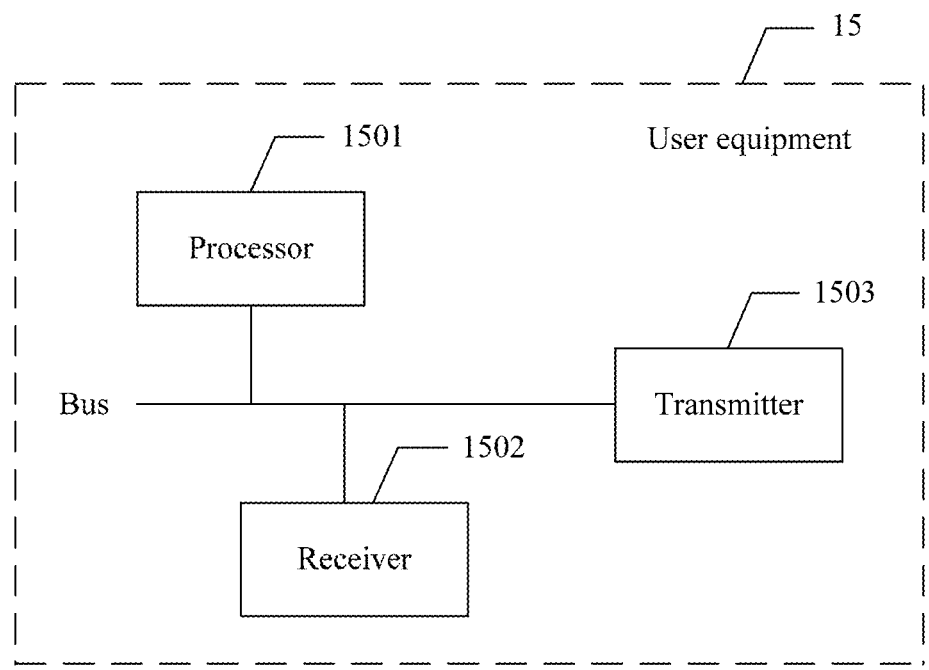
FIG. 15 is an embodiment diagram of user equipment according to an embodiment of the present invention.

A structure of user equipment in an embodiment of the present invention is described below. Referring to FIG. 15, FIG. 15 is an embodiment diagram of user equipment according to an embodiment of the present invention. The user equipment 15 may include at least one processor 1501, at least one receiver 1502, and at least one transmitter 1503 that are connected to a bus. The user equipment in the embodiment of the present invention may include components more or fewer than those shown in FIG. 15, may include a combination of two or more components, or may include components differently configured or disposed. Various components may be implemented by hardware including one or more signal processing and/or application-specific integrated circuits, in software, or in a combination of hardware and software.

Specifically, for the embodiment shown in FIG. 11, the processor 1501 can implement a function of the first processing module 1102 in Embodiment 5 shown in FIG. 11, the receiver 1502 can implement a function of the first receiving module 1101 in Embodiment 5 shown in FIG. 11, and the transmitter 1503 can implement a function of the first sending module 1103 in Embodiment 5 shown in FIG. 11.

For FIG. 12, the processor 1501 can implement a function of the second processing module 1202 in Embodiment 6 shown in FIG. 12, the receiver 1502 can implement a function of the second receiving module 1201 in Embodiment 6 shown in FIG. 12, and the transmitter 1503 can implement a function of the second sending module 1203 in Embodiment 6 shown in FIG. 12.

Figure 16:
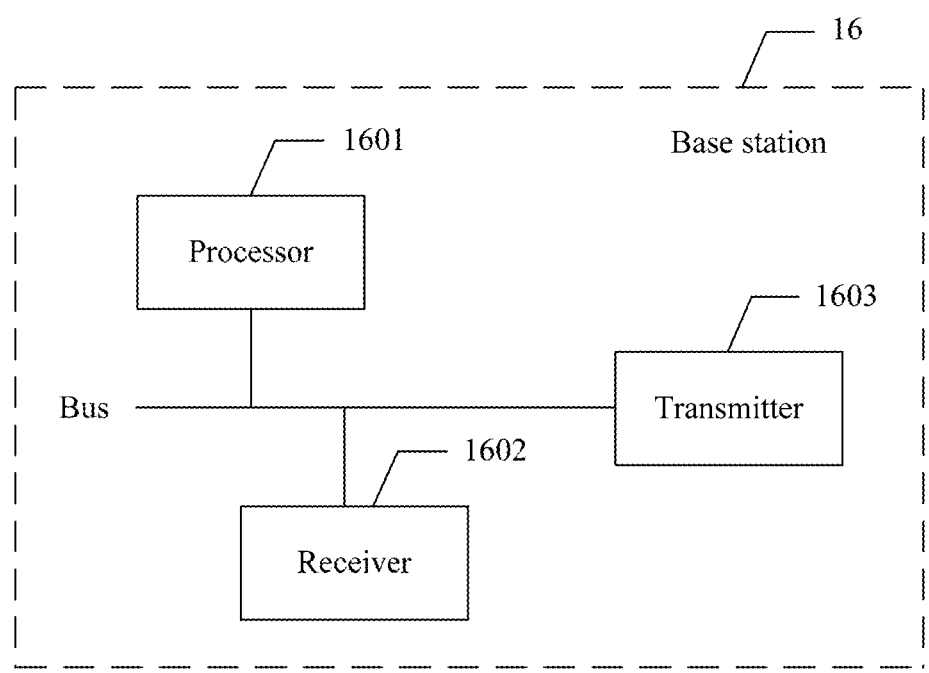
FIG. 16 is an embodiment diagram of a base station according to an embodiment of the present invention.

A structure of a base station in an embodiment of the present invention is described below. Referring to FIG. 16, FIG. 16 is an embodiment diagram of a base station according to an embodiment of the present invention. The base station 16 may include at least one processor 1601, at least one receiver 1602, and at least one transmitter 1603 that are connected to a bus. The base station in the embodiment of the present invention may include components more or fewer than those shown in FIG. 16, may include a combination of two or more components, or may include components differently configured or disposed. Various components may be implemented by hardware including one or more signal processing and/or application-specific integrated circuits, in software, or in a combination of hardware and software.

Specifically, for FIG. 13, the processor 1601 can implement a function of the first configuration module 1301 in Embodiment 7 shown in FIG. 13, the receiver 1602 can implement a function of the third receiving module 1303 in Embodiment 7 shown in FIG. 13, and the transmitter 1603 can implement a function of the third sending module 1302 in Embodiment 7 shown in FIG. 13.

For FIG. 14, the processor 1601 can implement a function of the first configuration module 1401 in Embodiment 8 shown in FIG. 14, the receiver 1602 can implement a function of the third receiving module 1403 in Embodiment 8 shown in FIG. 14, and the transmitter 1603 can implement a function of the third sending module 1402 in Embodiment 8 shown in FIG. 14.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
receiving, by a user equipment (UE), a first channel state information report type configured by a base station and K channel state information-reference signals (CSI-RSs) transmitted by the base station, wherein K is an integer greater than or equal to 1;
determining, by the UE and according to the first channel state information report type, at least one of a value of a rank indication (RI) and a value of a beamforming indication (BI) for S subbands, wherein the K CSI-RSs are transmitted on a wideband, wherein the wideband includes the S subbands, and wherein S is an integer greater than or equal to 1;
calculating, by the UE, a channel quality indicator (CQI) for the S subbands; and
reporting, by the UE and to the base station, the determined at least one of the value of the RI and the value of the BI, and the calculated CQI using a physical uplink control channel (PUCCH).

2. The method according to claim 1, wherein a reporting period of the BI is greater than or equal to a reporting period of the RI, a format of the report comprises a format 1, a format 2, and a format 3, a report in the format 1 reports the BI, a report in the format 2 reports the RI, a report in the format 3 jointly reports the BI and the RI, and each reporting period of the report in the format 1 and the report in the format 3 is an integer multiple of a reporting period of the report in the format 2.

3. The method according to claim 2, wherein a PUCCH feedback mode is PUCCH 1-1 or PUCCH 2-1, the PUCCH 1-1 and the PUCCH 2-1 each comprises reporting of the report in the format 2 and reporting of the report in the format 3, and the reporting period of the report in the format 3 is an integer multiple of the reporting period of the report in the format 2.

4. The method according to claim 2, wherein the reporting period of the BI is M times the reporting period of the RI, M is configured differently for different quantities of antenna ports, and M is an integer greater than or equal to 1.

5. The method according to claim 2, wherein the method further comprises:
determining, by the UE, a precoding type indicator (PTI) for the S subbands, wherein the PTI indicates a precoding type; and
the report in the format 1 further comprises a precoding matrix indicator (PMI) or the PTI, a report in the format 1 and comprising the PMI jointly reports the BI and the PMI, a report in the format 1 and comprising the PTI jointly reports the BI and the PTI, the report in the format 3 further comprises the PTI, and the report in the format 3 and comprising the PTI jointly reports the BI, the RI, and the PTI.

6. The method according to claim 1, wherein a PUCCH feedback mode is PUCCH 2-1, the UE has two or four antenna ports, a format of the report comprises a format 1, a format 2, and a format 3, a report in the format 1 jointly reports the BI and the RI, a report in the format 2 reports a wideband PMI and a wideband CQI, a report in the format 3 reports the RI, and a reporting period of the report in the format 1 is an integer multiple of a reporting period of the report in the format 2.

7. The method according to claim 1, wherein a PUCCH feedback mode is PUCCH 2-1, the UE has four or eight antenna ports, a format of the report comprises a format 1, a format 2, a format 3, and a format 4, a report in the format 1 jointly reports the BI, the RI, and a PTI, a report in the format 2 reports the RI and the PTI, a report in the format 3 reports a wideband PMI1 or reports a wideband CQI and a wideband PMI2, a report in the format 4 reports the wideband CQI and the wideband PMI2 or reports a subband CQI and a subband PMI2, and a reporting period of the report in the format 1 is an integer multiple of a reporting period of the report in the format 2.

8. The method according to claim 1, before the reporting, by the UE and to the base station, the determined at least one of the value of the RI and the value of the BI, and the calculated CQI using a physical uplink control channel (PUCCH), the method further comprising:
determining, by the UE, a quantity of CSI-RSs; and
determining, by the UE, at least one of the value of the RI and the value of the BI according to at least one of a quantity of spatial multiplexing layers and the quantity of CSI-RSs.

9. A user equipment, comprising:
a receiver, the receiver configured to receive a first channel state information report type configured by a base station and K channel state information-reference signals (CSI-RSs) transmitted by the base station, wherein K is an integer greater than or equal to 1;
at least one processor, the at least one processor configured to:
determine, according to the first channel state information report type, at least one of a value of a rank indication (RI) and a value of a beamforming indication (BI) for S subbands, wherein the K CSI-RSs are transmitted on a wideband, wherein the wideband includes the S subbands, and wherein S is an integer greater than or equal to 1; and
calculate a channel quality indicator (CQI) for the S subbands; and
a transmitter, the transmitter configured to report, to the base station, the determined at least one of the value of the RI and the value of the BI, and the calculated CQI using a physical uplink control channel (PUCCH).

10. The user equipment according to claim 9, wherein a reporting period of the BI is greater than or equal to a reporting period of the RI, a format of the report comprises a format 1, a format 2, and a format 3, a report in the format 1 reports the BI, a report in the format 2 reports the RI, a report in the format 3 jointly reports the BI and the RI, and each reporting period of the report in the format 1 and the report in the format 3 is an integer multiple of a reporting period of the report in the format 2.

11. The user equipment according to claim 10, wherein a PUCCH feedback mode is PUCCH 1-1 or PUCCH 2-1, the PUCCH 1-1 and the PUCCH 2-1 each comprises reporting of the report in the format 2 and reporting of the report in the format 3, and the reporting period of the report in the format 3 is an integer multiple of the reporting period of the report in the format 2.

12. The user equipment according to claim 10, wherein the reporting period of the BI is M times the reporting period of the RI, M is configured differently for different quantities of antenna ports, and M is an integer greater than or equal to 1.

13. The user equipment according to claim 10, wherein the processor is further configured to:
 determine a precoding type indicator (PTI) for the S subbands, wherein the PTI indicates a precoding type; and
 the report in the format 1 further comprises a precoding matrix indicator (PMI) or the PTI, a report in the format 1 and comprising the PMI jointly reports the BI and the PMI, a report in the format 1 and comprising the PTI jointly reports the BI and the PTI, the report in the format 3 further comprises the PTI, and the report in the format 3 and comprising the PTI jointly reports the BI, the RI, and the PTI.

14. The user equipment according to claim 9, wherein a PUCCH feedback mode is PUCCH 2-1, the user equipment has two or four antenna ports, a format of the report comprises a format 1, a format 2, and a format 3, a report in the format 1 jointly reports the BI and the RI, a report in the format 2 reports a wideband PMI and a wideband CQI, a report in the format 3 reports the RI, and a reporting period of the report in the format 1 is an integer multiple of a reporting period of the report in the format 2.

15. The user equipment according to claim 9, wherein a PUCCH feedback mode is PUCCH 2-1, the user equipment has four or eight antenna ports, a format of the report comprises a format 1, a format 2, a format 3, and a format 4, a report in the format 1 jointly reports the BI, the RI, and a PTI, a report in the format 2 reports the RI and the PTI, a report in the format 3 reports a wideband PMI1 or reports a wideband CQI and a wideband PMI2, a report in the format 4 reports the wideband CQI and the wideband PMI or reports a subband CQI and a subband PMI, and a reporting period of the report in the format 1 is an integer multiple of a reporting period of the report in the format 2.

16. The user equipment according to claim 9, wherein the at least one processor is further configured to:
 determine a quantity of CSI-RSs; and
 determine at least one of the value of the RI and the value of the BI according to at least one of a quantity of spatial multiplexing layers and the quantity of CS-RSs.

* * * * *

UNITED STATES PATENT AND TRADEMARK OFFICE
CERTIFICATE OF CORRECTION

PATENT NO. : 10,680,696 B2
APPLICATION NO. : 15/971076
DATED : June 9, 2020
INVENTOR(S) : Jianqin Liu Page 1 of 1

It is certified that error appears in the above-identified patent and that said Letters Patent is hereby corrected as shown below:

On the Title Page

Item (57) Abstract, in Column 2, Line 11, after "subbands" insert -- . --.

Signed and Sealed this
Eighth Day of December, 2020

Andrei Iancu
*Director of the United States Patent and Trademark Office*